United States Patent
Bulpitt et al.

(10) Patent No.: US 12,148,962 B2
(45) Date of Patent: Nov. 19, 2024

(54) MODULAR FUEL CELL SYSTEM ARCHITECTURE AND A CONTROL SYSTEM FOR DISTRIBUTING POWER TO THE MODULES

(71) Applicant: TOYOTA MOTOR ENGINEERING & MANUFACTURING NORTH AMERICA, INC., Plano, TX (US)

(72) Inventors: Christopher M. Bulpitt, Los Angeles, CA (US); Daniel Charles Folick, Long Beach, CA (US); Jared Farnsworth, Gardena, CA (US); Andrew Sata, Irvine, CA (US); Arlo C. Eitzer, Ann Arbor, MI (US); Laura E. Bower, Whitmore Lake, MI (US); Daniel K. Lim, Canton, MI (US); Jonathan J. Sander, Greenville, OH (US); Luke A. Rippelmeyer, Plano, TX (US); Scott A. Friedman, Dallas, TX (US); Takehito Yokoo, Aliso Viejo, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/539,774

(22) Filed: Dec. 1, 2021

(65) Prior Publication Data
US 2023/0170508 A1 Jun. 1, 2023

(51) Int. Cl.
*H01M 8/04* (2016.01)
*H01M 8/04858* (2016.01)
*H01M 8/249* (2016.01)

(52) U.S. Cl.
CPC ......... *H01M 8/0494* (2013.01); *H01M 8/249* (2013.01); *H01M 2220/20* (2013.01)

(58) Field of Classification Search
CPC ................ H01M 8/0494; H01M 8/2475
See application file for complete search history.

(56) References Cited

U.S. PATENT DOCUMENTS

| | | |
|---|---|---|
| 5,512,022 A | 4/1996 | Suzuki |
| 6,405,818 B1 | 6/2002 | Anthony |

(Continued)

FOREIGN PATENT DOCUMENTS

| | | |
|---|---|---|
| CN | 104972918 | 10/2015 |
| CN | 108092211 A | 5/2018 |

(Continued)

OTHER PUBLICATIONS

Marx et al., "A review of multi-stack and modular fuel cell systems: Interests, application areas and on-going research activities," International Journal of Hydrogen Energy vol. 39 Issue 23, Aug. 4, 2014., pp. 12101-12111.

(Continued)

*Primary Examiner* — Olatunji A Godo
(74) *Attorney, Agent, or Firm* — SHEPPARD, MULLIN, RICHTER & HAMPTON LLP; Daniel N. Yannuzzi

(57) ABSTRACT

Systems and methods are provided for modularizing a system. Parallel power systems having electronically isolated high voltage systems facilitate modulization. A control system is provided that optimizes the distribution of a power demand and/or a torque request so as to keep the efficiency, durability, drivability and/or safety of the system within an optimum range. In some cases, the distribution of power is uneven, so as to extend the battery life, while in other cases, the power draw on battery systems are kept equal and constant so as to properly manage the state of charge of the parallel power systems. In still other cases, the chosen power distribution keeps the power demand and/or torque request between minimum and maximum levels/capacity, and the (Continued)

power distribution avoids on/off of an individual power system.

20 Claims, 7 Drawing Sheets

(56) References Cited

U.S. PATENT DOCUMENTS

| | | | |
|---|---|---|---|
| 6,439,923 B1 | 8/2002 | Kirkendall | |
| 6,672,415 B1* | 1/2004 | Tabata | B60L 58/34 |
| | | | 903/910 |
| 2003/0235740 A1 | 12/2003 | Haltiner | |
| 2004/0034460 A1 | 2/2004 | Folkerts | |
| 2004/0263099 A1 | 12/2004 | Maslov | |
| 2009/0025315 A1 | 1/2009 | Gutfleisch | |
| 2013/0151045 A1 | 6/2013 | Park | |
| 2013/0241445 A1 | 9/2013 | Tang | |
| 2014/0222265 A1 | 8/2014 | Miftakhov | |
| 2017/0361840 A1 | 12/2017 | Valentine | |
| 2018/0086343 A1 | 3/2018 | Crain | |
| 2019/0005183 A1 | 1/2019 | Nada | |
| 2019/0126864 A1 | 5/2019 | Takamatsu | |
| 2019/0222005 A1 | 7/2019 | Steinkamp | |
| 2020/0125858 A1 | 4/2020 | Bauer | |
| 2020/0366030 A1 | 11/2020 | Go | |
| 2021/0344214 A1 | 11/2021 | Patel | |
| 2022/0024433 A1* | 1/2022 | Yuyama | F16D 65/183 |
| 2022/0324322 A1* | 10/2022 | Kim | B60K 7/0007 |

FOREIGN PATENT DOCUMENTS

| | | |
|---|---|---|
| CN | 207853758 | 9/2018 |
| CN | 110085889 | 8/2019 |
| CN | 110521106 | 11/2019 |
| CN | 210126492 U | 3/2020 |
| CN | 112036603 A | 12/2020 |
| JP | 2012060729 A | 3/2012 |

OTHER PUBLICATIONS

Green Car Congress, "Plug power introduces new fuel-cell system for heavy-duty on-road applications," Feb. 18, 2020.

Wang et al., "Hydrogen consumption minimization method based on the online identification for multi-stack PEMFCs system," International journal of hydrogen energy, vol. 44, Issue 11, Feb. 26, 2019.

* cited by examiner

MODULAR FUEL CELL SYSTEM ARCHITECTURE AND A CONTROL SYSTEM FOR DISTRIBUTING POWER TO THE MODULES

TECHNICAL FIELD

The present disclosure relates generally to fuel cell systems in vehicles, and in particular, some implementations may relate to modular fuel cell system architectures which allow for mass production of fuel cell powertrain systems for a wide array of applications or vocations. Various embodiments relate to a control system for distributing power to the modules of the system.

DESCRIPTION OF RELATED ART

Fuel cells may be stacked in a manner in which the fuel cells are in electrical communication for powering a system. Fuel cells can be used to power vehicles. An assembly line is sometimes used to aid mass production. When batteries and combustion engines are used together in a hybrid vehicle, at times the combustion engine recharges the battery.

BRIEF SUMMARY OF THE DISCLOSURE

According to various embodiments of the disclosed technology a modular system of a vehicle is provided, the modular system comprising: a shaft; and a plurality of parallel systems that are electrically isolated from one another, the plurality of parallel systems comprising: a first parallel system for rotating the shaft, the first parallel system comprising a first motor coupled to the shaft to rotate the shaft, and a first parallel system power generation module coupled to the motor to drive the first motor; and a second parallel system to rotate the shaft, the second parallel system comprising a second motor coupled to the shaft for rotating the shaft, and a second parallel system power generation module coupled to the second motor to drive the second motor.

Embodiments of the modular system may include one or more of the following features. The modular system further comprises an electrical control system that receives input indicative of an amount of torque to request the modular system to produce; and apportions generation of an amount of power between the plurality of parallel systems, wherein the apportioning is performed based on individual states of individual parallel systems of the plurality of parallel systems; and wherein the electrical control unit comprises states in which the first parallel system provides a different amount of torque than the second parallel system. The modular system further comprising: an electrical control unit comprising states in which a different percentage of a total power is requested from different parallel systems of the plurality of parallel systems, wherein the total power is a total power requested for driving the vehicle.

According to various embodiments of the disclosed technology a modular system of a vehicle is provided, the modular system comprising: a shaft; a control system; and a plurality of parallel systems, the plurality of parallel systems comprising: a first parallel system to rotate the shaft, the first parallel system comprising a first motor coupled to the shaft for rotating the shaft, and a first parallel system power generation module coupled to the motor to drive the first motor; and a second parallel system to rotate the shaft, the second parallel system comprising a second motor coupled to the shaft for rotating the shaft, and a second parallel system power generation module coupled to the second motor to drive the second motor; wherein, when the control system is activated, the control system performs operations comprising: receiving input indicative of an amount of torque to request the modular system to produce; and apportioning generation of the amount of power between the plurality of parallel systems; wherein the apportioning depends at least on individual states of individual parallel systems of the plurality of parallel systems; and wherein the electrical control system comprises states that occur during normal operation in which the first parallel system is requested to provide a different mount of torque than the second parallel system.

Embodiments of the modular system may include one or more of the following features. The first parallel system further comprises: a first-parallel system energy module of a first type, that supplies electrical power to the first motor; and a first-parallel system energy module of a second type, that supplies electrical power to the first motor. The first-parallel system energy module of the first type comprises a fuel cell; and the first-parallel system energy module of the second type comprises a battery that is capable of driving the first motor. The apportioning being determined to apportion power between the plurality of parallel systems in order to keep a current state of charge of batteries of the plurality of parallel systems above a threshold value. The apportioning being determined to apportion power between the plurality of parallel systems in order to keep a given power requested from a given parallel system of the plurality of parallel systems below an upper threshold that is based on a maximum available power of that is available, via the given parallel system, for driving the modular system. The apportioning being determined to apportion power between the plurality of parallel systems in order to keep a given power requested from a given parallel system of the plurality of parallel systems above a lower threshold. The apportioning being determined to apportion power between the plurality of parallel systems in order to equalize a power draw from each battery system of each parallel system with respect to one another, so as to extend battery life. The apportioning being determined to apportion power between the plurality of parallel systems in order to maintain a constant draw of power from each battery system of each parallel system, when the battery system is not being charged, so as to extend battery life. The apportioning being determined to apportion power between the plurality of parallel systems in order to equalize a draw of charge from each battery of each parallel system with respect to one another. The apportioning being determined to apportion power between the plurality of parallel systems in order to achieve a fuel efficiency that is higher than without the apportioning. The apportioning being determined to apportion power between the plurality of parallel systems in order to maintain a durability of the modular system that is better than without the apportioning. The apportioning being determined to apportion power between the plurality of parallel systems in order to keep the amount of cycling between turning on a given parallel system of the plurality of parallel systems and turning off the given system to less than a threshold value. The apportioning being determined to apportion power between the plurality of parallel systems in order to maintain specified drivability requirements. The drivability requirements include keeping vibrations less than a predefined threshold. The apportioning comprises diverting power from a parallel system having a torque derating to a system that does not have a torque derating, so as to meet a requested torque. The apportioning comprises diverting power from a parallel system having a motor that is running at a higher temperature than other motors of the modular system. The apportioning being determined to apportion power between the plurality of parallel systems in order to rotate the shaft outside of a specified frequency band that includes a resonant frequency of the modular system.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide a modular vehicle architecture.

Figure 4:
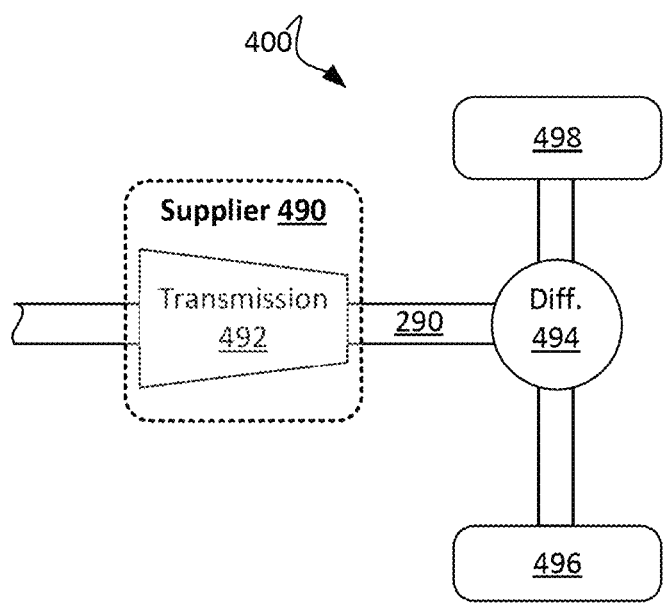
FIG. 4 illustrates various embodiments of a drivetrain system that may be used with the system of FIG. 2.
Figure 5:
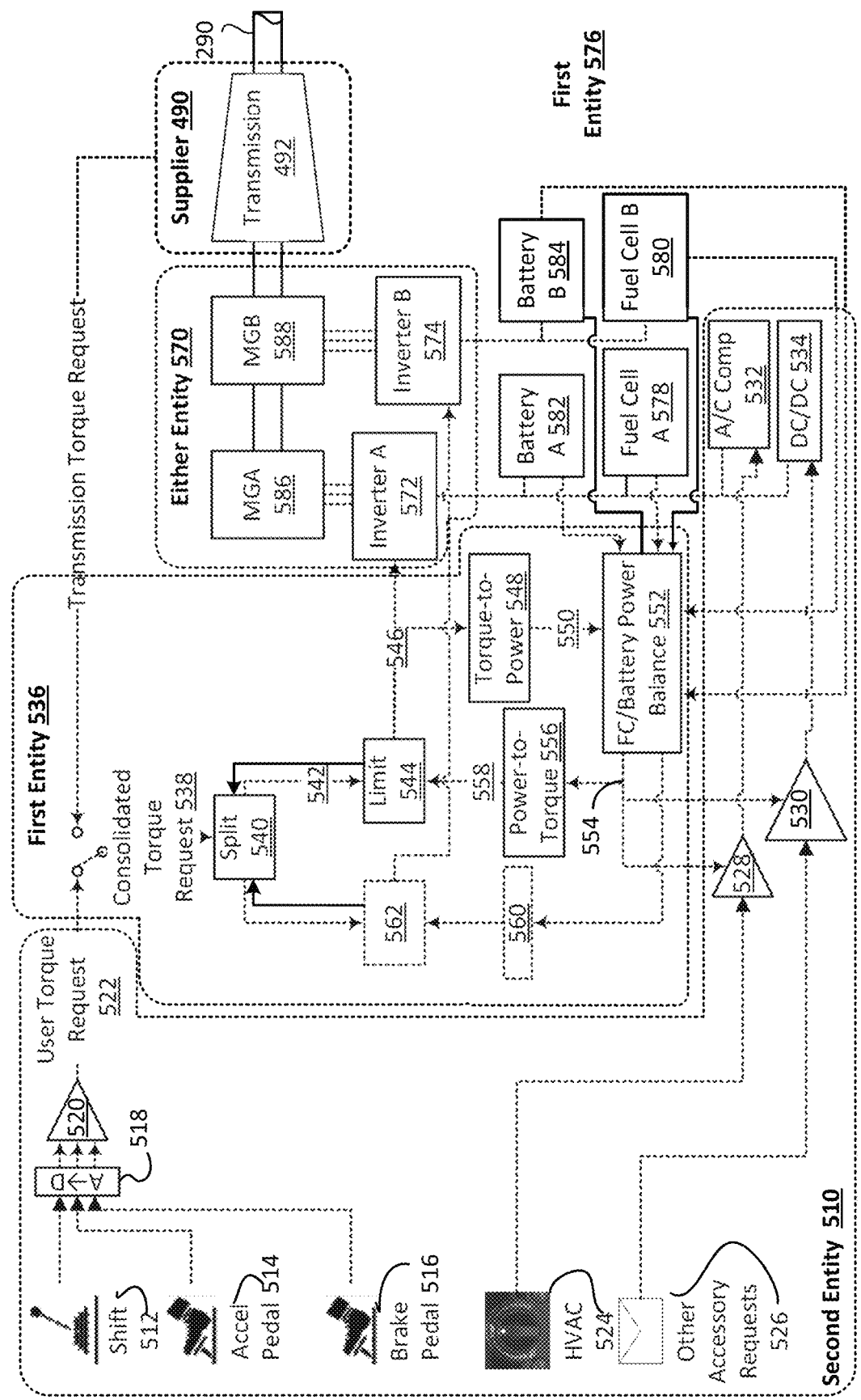
FIG. 5 illustrates a diagram of various embodiments of a logic system, which may include the power distribution system of FIG. 3A, may be used within system FIG. 1, and/or may be used with the high voltage system of FIG. 2.
Figure 6:
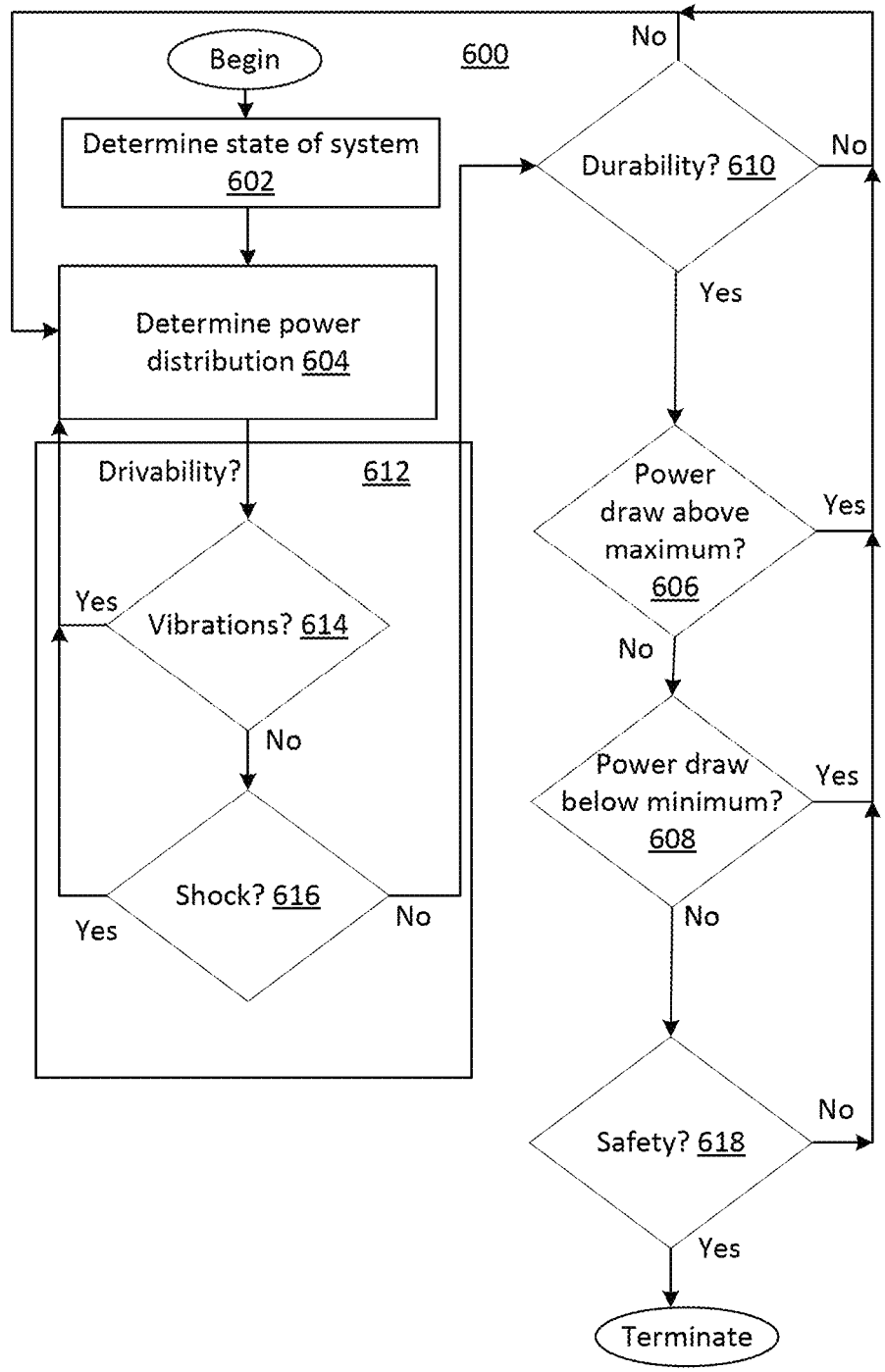
FIG. 6 illustrate a method for apportioning power between parallel systems, which may be implemented by the logic system of FIG. 5 and/or the power distribution system of FIG. 3A.

FIGS. 1-5 and 7 describe a modular system in which a vehicle may be put together in a modular fashion, so as to accommodate a variety of OEM vehicle configurations, whereas FIG. 6 describes method of operating the modular system of FIGS. 1-5 and 7. The modular system may include a mass-producible modular fuel cell powertrain system with an architecture that is adaptable and/or may be customized for a large verity of vehicles. The manufacturer may control the components and communications of the components with each other, power delivery from fuel cell and battery to powertrain, at least on one side (e.g., the manufacturer's side) of the system. In various embodiments, to make different parallel systems modular, the high voltage portion of the parallel systems are kept electrically isolated from one another.

By keeping the high voltage portion of the parallel system electrically isolated, the assembly of the parallel systems are not intertwined, when constructing into one unified system (for the parallel system modules), thereby facilitated the removal or addition of the different modules, with minimal (if any) changes in structure to the rest of the system for accommodating the difference in structure (other than possibly using a different harness). However, as a result of keeping the high voltage portion of parallel systems electrically isolated, the parallel systems cannot transfer high voltage electrical power between parallel system, which may be thought to lead to various inefficiencies. Also, different parallel systems may have different power demands (e.g., some parallel systems may power auxiliary and/or accessory systems in addition to meeting torque requests for driving locomotion, whereas other parallel systems may not be tasked with powering accessories or auxiliary systems), complicating optimization of the system. Fortunately, it has been found that keeping the high voltage parallel systems electrically isolated facilitates optimization of efficiency, durability, drivability, and therefore performance of the system, while facilitating proper battery management, by facilitating controlling the parallel systems individually, according to at least some embodiments of system disclosed herein.

By keeping the power draw on the battery systems of each parallel system constant and approximately equal (e.g., within 10% of one another, within 5% of one another, or within 1% of one another, depending on the embodiments), the state of charge of the battery systems for the system as whole is better managed, extending battery life, improving the durability and efficiency of the systems. To keep the draw of power and/or charge of the batteries generally equal and constant, typically, the distribution of power for meeting the power demands of the system is uneven or unbalanced, and different parallel system are tasked with supplying different amounts of power and/or torque for powering the system. Additionally, the power draw from fuel cells may be kept relatively constant, and transient power requests are met with the aid of (or completely by) high voltage batteries. As will be further elaborated upon below, in optimizing the system, durability, drivability, efficiency are taken into account, and power distributions that may result in certain conditions that are bad for durability, drivability, and/or efficiency are avoided (e.g., requests from an individual parallel system for too little or too much power, power distributions that may result in vibrations, shocks to the system, and/or frequent cycling between a given parallel system being turned off and on are avoided).

"Drivability" refers to how well the vehicle drives or how a system operates. Drivability may refer to anything that affects (e.g., improves or detracts from) the driver experience. Drivability may include anything that could make a driver uncomfortable or more comfortable. Drivability may include how the vehicle responds to the user controls, and whether the response to driver input is the response that a driver would expect.

In other words, various embodiments, the system includes controls that optimize a power split between different modules, so as to optimize the durability, drivability/performance, efficiency, and/or safety, which may be optimized together. The system may be included in heavy duty electric trucks using multiple fuel cells and batteries and/or other vehicles. The system may also extend battery life by improving state-of charge (SoC) management.

The power distribution may take into account the overall energy management, the power generation efficiency (e.g., how much electrical or mechanical power is generated per unit volume of hydrogen), and the efficiency of the motors (the ratio of the electrical power input to the mechanical power output).

Some factors that affect drivability are the extent to which the system meets a torque demand. Also, the amount of vibrations should be kept relatively low (e.g., if the motors need to operate at a particular torque to meet a driver demand, it may make sense to only use one motor and operate the motor at a higher torque, instead of operating two motors, each at lower torques, so as to minimize vibrations, since the vibrations contributed by each motor tend to add). Another factor that may affect drivability is if there is a sudden increase in speed when accelerating or decelerating, causing a shock to the system, and keeping the drivability acceptable may include reducing, avoiding, and/ or eliminating shocks to the system, because shocks/vibrations within the vehicle may detract from drivability. Also, re-engaging a shift may be noticeable to the driver, and it may be desirable that a change in speed should not cause shock. Similarly, frequent changes in gears should be avoided (e.g., by keeping the frequency of changes in gears to less than a threshold value). Similarly, there may be certain frequency bands of operation for the motor (e.g., as a result of producing torque at a given RPM), where there may be resonant vibration. It may therefore be desirable to avoid the bands that cause resonance by using a power split or by changing the power split to a power split that does not require running the motors within the frequency band that includes a resonant frequency.

Regarding minimizing on-off cycling, it may be desirable to keep the parallel systems from having to turn off and on at a frequency that is greater than a threshold value (the threshold value may be dependent on the parallel system or may be the same threshold value for all parallel systems, depending on the embodiment). In general, in this specification, whenever a threshold value is mentioned, in various embodiments, the threshold may be dependent on the parallel system and/or there may be one threshold for all the parallel systems. The system may keep the power draw from each parallel system above a threshold value to reduce the frequency that any given parallel system turns on and off at rate that is above a threshold value. In various embodiments, on/off toggling may be prevented by keeping the power draw above a minimum threshold.

In various embodiments, safety of the driver may be assigned the highest priority ranking. In various embodiments, safety of the driver may be ranked higher than durability of the system. Durability of the system may be ranked higher than drivability. Drivability may be ranked higher than efficiency. In other embodiments, the ranking of the priorities between safety, drivability, durability, and efficiency may be different.

In various embodiments, the priority of avoiding certain conditions may change with the degree to which the condition occurs. There may be some factors that affect drivability that are also related safety, and the distinction between whether a particular factor is a drivability issue, or a safety issue, may be a matter of degree (thereby affecting the priority given to avoiding the issue). For example, there may be a threshold for the degree of vibrations, and if the vibrations are below that threshold, the vibrations are considered a drivability issue, whereas if the vibrations are above that threshold, the vibrations may be considered as a safety risk. Similarly, if there is a small discrepancy between the torque the user requested and the torque provided, it may considered a drivability issue, whereas if the discrepancy is a above a given threshold, the discrepancy may be considered a safety issue (since a vehicle that does not respond to driver instructions can lead to accidents).

Having parallel systems that have the high voltage portion of the parallel systems electrically isolated from each other, allows for power splitting, balancing. Due to the parallel hardware configuration (each parallel system having a battery, and fuel cell that connects to a motor that drives the shaft) the system can control each parallel system individually.

The torque outputs from OEM requests may be optimized by looking at motor conditions (e.g., one of the motors is at a higher temperature so it is operating inefficiently, so that motor is used less). The torque request from the OEM is achieved by distributing the torque/power demand between the parallel systems. All the factors need to be considered when determining the power split.

The motors are each powered by a different parallel system. Motors can produce torque on the same shaft, but their power sources are separate (separate fuel cell and separate batteries).

When, the state of charge (SOC) for battery of parallel system A is very lower, the system may respond in a number of ways, which may include decreasing the torque being requested of motor A. When the torque requested by motor of parallel system A is reduced, more of the power from the fuel cell is directed towards charging the battery of parallel system A. Another manner of dealing with a low state of charge is to increase the fuel cell production to make more power go into the battery. Another manner of dealing with a battery with a low state of charge, is to change the power split. Each manner of dealing with the low state of charge may be used individually or used together with the any or all of the other ways of dealing with a low state of charge.

Vehicle Level Control may be used to manage the vehicle level available power. If an equal split between two systems, but one system cannot provide enough power due to SOC, the vehicle level power split may increase the demand from system with excess power and decrease the demand from the system with lower energy. Vehicle level power split looks at what each parallel system can do, and the vehicle level power split makes an optimization judgment. For example, in various embodiments, if parallel system B has become limited for any reason, the load demand on parallel system A may be increased. As another example, if the power that system B has become limited for any reason (e.g., the motor of parallel system b is at a high enough temperature to cause the motor of parallel system B to operate inefficiently), some of the power load may shifted to other parallel systems.

Figure 1:
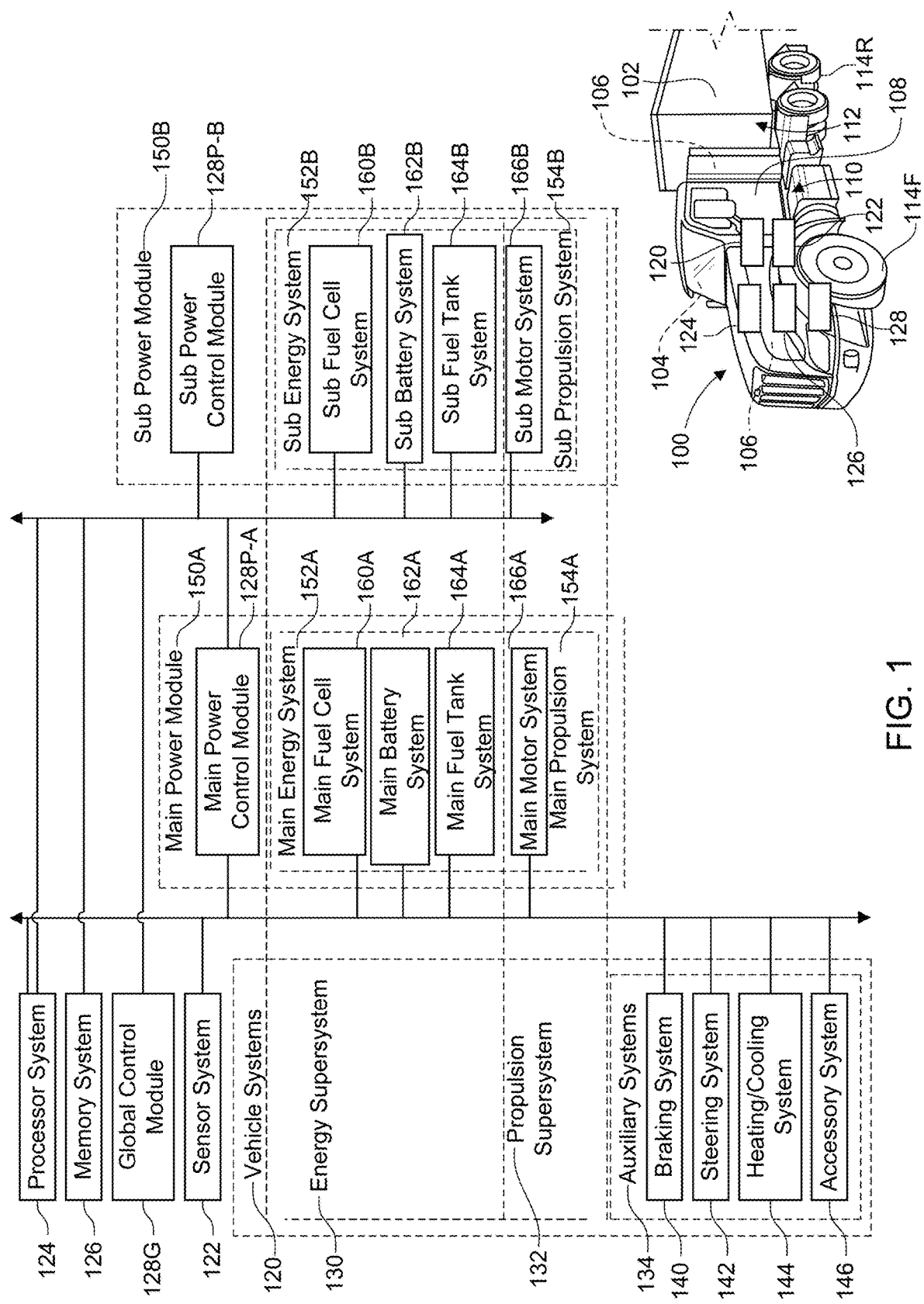
FIG. 1 illustrates various embodiments of a modular system.

FIG. 1 illustrates an embodiment of a system 100, which may include a semi-tractor fuel cell vehicle in which the modular fuel cell architecture may be included. System 100 may have a modular construction. The system 100 of FIG. 1, which may be a fuel cell vehicle (FCV), is just one example of an electrified vehicle, within which the modular architecture may be included. To facilitate the modular construction, the different parallel systems that power system 100 are kept electrically isolated. By keeping the parallel system electrically isolated, each parallel system can be added and/or removed without having an effect on the other parallel systems (e.g., other than the need for using a different electrical harness). However, keeping the parallel systems electrically isolated may increase the degree of cycling—that is, electrical isolation may lead to an increase in the turning on and off the fuel systems, because the power parallel systems cannot share electrical power and charge one another's batteries, for example. Similarly, since the parallel systems are electrically isolated, the battery system of one parallel system cannot aid in powering the motor of another parallel system, which may lead to inefficiencies. In system 100, the torque request may be distributed between parallel systems in manner that keeps the fuel efficiency in an optimum range, accounts for differences in efficiencies of different motors, reduces the need to turn-on and off fuel cells, keeps the drivability/operability of system 100 within an optimum range, and/or keeps the durability of the system 100 within an optimum range.

Although a semi-tractor fuel cell vehicle is used as an example, any vehicle may be substituted. In other embodiments, system 100 may be any system that is powered by engines. Different parts of system 100 may be supplied by different entities. For example, a first subentity (e.g., a first division of an original manufacturer) may supply and/or assemble a first set of components, a second subentity (e.g., a second division of the original manufacturer) may supply and/or assemble a second set of components, and/or second entity (e.g., a second company, which may be an Original Equipment Manufacturer (OEM)) may supply and/or assemble a second set of components. In this specification, whenever a "first subentity" is mentioned a first entity, first manufacturer may be substituted whenever a "manufacturer" is mentioned a first entity maybe substituted. In this specification, whenever a "second subentity" is mentioned a subentity of a first entity, a second entity of a manufacturer and/or second manufacturer may be substituted whenever a "second manufacturer" is mentioned a first subentity maybe substituted. In this specification, whenever an "OEM" is mentioned a second entity may be substituted whenever a "second entity" is mentioned an OEM maybe substituted. It may be desirable that the components are modular, and that the modules fit together in a modular manner and/or electrically connected by a modular harness, so that the same modules may be used in different vehicles having different chassis, power requirements, types of fuel cells, and/or different numbers of fuel cell systems.

In this description, uses of "front," "forward" and the like, and uses of "rear," "rearward" and the like, refer to the longitudinal directions of the system 100. "Front," "forward" and the like refer to the front (fore) of the system 100, while "rear," "rearward" and the like refer to the back (aft) of the system 100. Uses of "side," "sideways," "transverse" and the like refer to the lateral directions of the system 100, with "driver's side" and the like referring to the left side of the system 100, and "passenger side" and the like referring to the right side of the system 100.

In various embodiments, system 100 is a semi-tractor or, in other words, a tractor unit that, together with a hitched semitrailer 102, forms a semi-truck. In other embodiments system 100 may be another type of vehicle. System 100 may have an exterior compartment and one or more interior compartments. The compartments of system 100 may include a passenger compartment 104 and/or one or more engine compartments 106. System 100 may include, among other things, seats and a dash assembly housed in its passenger compartment 104.

System 100 may have a body 108 that forms its exterior and defines the compartments of system 100. Body 108 may have upright sides, a floor, a front end, a rear end, and/or a roof, for example. In the embodiments in which system 100 is a semi-truck, the semitrailer 102 similarly may have an exterior and an interior. Semitrailer may also have an interior compartment and/or a cargo compartment for carrying cargo, which may be an exterior compartment. In addition to body 108, system 100 may have a chassis 110. Chassis 110 may serve as an underbody for system 100. Chassis 110, like the body 108, forms the exterior of the system 100. As part of the chassis 110, the system 100 may include a hitch 112 for hitching semitrailer 102 to system 100. With the semitrailer 102 hitched to system 100, system 100 may be capable of pulling semitrailer 102 and any onboard cargo. In an embodiment, system 100 may be built and/or assembled by a different entity than the entity (or entities) that builds/assembles part of the engine.

System 100 may include a modular drivetrain. The drivetrain may be part of, mounted to, or otherwise supported by, chassis 110. The drivetrain may be housed, in whole or in part, in any combination of the passenger compartment 104, the engine compartments 106 or elsewhere in the system 100. As part of the drivetrain, the system 100 may include wheels 114. The wheels 114 support the remainder of the system 100 on the ground. Using a modular fuel cell system (e.g., having a modular drive train), may facilitate accommodating different chassis of different sizes, shapes, and/or configurations. In the embodiments illustrated in FIG. 1, system 100 includes ten wheels 114, two of which are front wheels 114F, and eight of which are rear wheels 114R (however, in other embodiments there may be a different number of wheels). The rear wheels 114R may be arranged in four dual-wheel setups. The rear wheels 114R belonging to two driver's side dual-wheel setups are shown, with the other two, passenger side dual-wheel setups. The passenger side dual-wheel setups may be mirror images of the driver's side dual wheel setups. The passenger dual-wheel setups may include the remaining rear wheels 114R, which are not shown in FIG. 1. One, some, or all, of the wheels 114 may powered to drive system 100 along the ground. In rear-wheel drive embodiments, one, some, or all, of the rear wheels 114R may be powered to propel system 100 along the ground. For the purpose of propelling system 100, also as part of the drivetrain, in addition to the wheels 114, system 100 may include a combination of a transmission, a differential, and/or a drive shaft to which the wheels 114 may be mechanically connected. Optionally, drive train may be assembled/built by a different entity than the entity that builds/assembles the semi-trailer 102, compartment 104, body 108, chassis 110, hitch 112, and/or wheels 114.

System 100 operates as an assembly of interconnected items that equip the system 100 to satisfy real-time vehicle and/or system demands. A vehicle demand may correspond to a vehicle function whose performance satisfies the vehicle demand. Accordingly, the system 100 is equipped, in operation, to satisfy one or more vehicle demands by performing one or more corresponding vehicle functions. With respect to performing vehicle functions, system 100 is subject to any combination of manual operations and autonomous operations. For example, system 100 may be manual-only, semi-autonomous, highly autonomous, or fully autonomous.

System 100 may include one or more vehicle systems 120 for satisfying various vehicle demands. Any of vehicle systems 120 may be capable of performing vehicle functions on behalf of the system 100 (alone or in conjunction with the drivetrain), and thereby satisfying corresponding vehicle demands on behalf of the system 100. Any combination of vehicle systems 120 may be operable to perform a vehicle function.

In addition to vehicle systems 120, system 100 includes a sensor system 122, as well as processor system 124, memory system 126, and one or more control modules 128 (which, again, may be implemented as one control circuit or as a plurality of individual control circuits) to which the vehicle systems 120 and the sensor system 122 are communicatively connected ("control modules 128" is used to collectively refer to global control modules 128G and power control module 128P). Control modules 128 may determine the distribution the generation of power between the submodules of system 100 and/or between the main module and one or more submodules of system 100.

In this specification, the term "main" as in "main module" or "main system" differs from the submodules and/or parallel systems in that the main module or main system may send control signals to control parts of or all of the subsystems and/or submodules. In this specification, the term "parallel systems" is generic to both subsystems and the main system. However, the term "subsystem," is also intended to be generic to both the main system and the other subsystems, and thus when a plurality of "subsystems" are referred to without any indication of the existence of a main system, any of the subsystems may be a main system. In various embodiments "parallel systems" have high voltage systems that are electrically parallel to one another and/or mechanically parallel to one another, but parallel systems may share a common control system. In various embodiments parallel systems convert energy in a fuel and/or stored energy (e.g., in a battery) into mechanical energy that may be converted used for propelling a vehicle, optionally by turning a shaft that directly or indirectly causes the vehicle to travel. Optionally two parallel systems may turn the same shaft.

The sensor system 122 may be operable to detect information about the system 100. Sensor system 122 can include a plurality of sensors that can be used to detect various conditions internal or external to system 100, and provide information (e.g., sensor information, which may be information that is) indicative of, and/or characterizing the conditions that were sensed to processor system 124 and/or control modules 128.

In various embodiments, one or more of the sensors of sensor system 122 may include their own processing capability to compute the results for additional information that can be provided to control modules 128 (which may include electronic control units). In other embodiments, one or more sensors may be data-gathering-only sensors that provide only raw data to processor system 124 and/or control modules 128. In further embodiments, hybrid sensors may be included that provide a combination of raw data and processed data to control modules 128. Sensors of sensor system 122 may provide an analog output or a digital output.

Sensors of sensor system 122 may be included to detect not only vehicle conditions but also to detect external conditions as well. Sensor system 122 may be include sensors that might be used to detect external conditions, which may include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Processor system 124 may include one or more processors. Processor system 124, the memory system 126 and the control modules 128, together, may serve as one or more computing devices whose control modules 128 are employable to orchestrate the operation of system 100.

Specifically, control modules 128 may operate vehicle systems 120 based on information about the system 100. Accordingly, as a prerequisite to operating vehicle systems 120, the control modules 128 may gather information about system 100, including any combination of the information about the system 100 detected by sensor system 122 and/or information about the system 100 communicated between the control modules 128. Control modules 128 may then evaluate the information about the system 100, and control modules 128 may operate the vehicle systems 120 based on their evaluation. As part of the evaluation of the information about the system 100, the control modules 128 may identify one or more vehicle demands. When a vehicle demand is identified, the control modules 128 may operate one or more associated vehicle systems 120 to satisfy the vehicle demand.

The vehicle systems 120 may be part of, mounted to or otherwise supported by the chassis 110. The vehicle systems 120 may be housed, in whole or in part, in any combination of the passenger compartment 104, the engine compartments 106, or elsewhere in the system 100. Each vehicle system 120 may include one or more vehicle elements. Each vehicle element may operable to perform, in whole or in part, any combination of vehicle functions with which the vehicle system 120 is associated. It will be understood that the vehicle elements, as well as the vehicle systems 120 to which they belong, may be mutually distinct but need not be mutually distinct.

The vehicle systems 120 may include an energy supersystem 130 and a propulsion supersystem 132. The energy supersystem 130 and the propulsion supersystem 132 may be electrically connected to one another. The drivetrain may be mechanically connected to propulsion supersystem 132. The propulsion supersystem 132 and the drivetrain together serve as an electrified powertrain for system 100. The energy supersystem 130 may perform one or more energy functions, including but not limited to generating electrical energy. The propulsion supersystem 132 is operable to perform one or more propulsion functions using electrical energy from the energy supersystem 130, including but not limited to powering the wheels 114.

Specifically, the energy supersystem 130 may be operable to generate electrical energy, store electrical energy, condition electrical energy, and/or otherwise handle electrical energy, and store and otherwise handle fuel. In conjunction with the drivetrain, the propulsion supersystem 132 may be operable to power the wheels 114 using electrical energy from the energy supersystem 130. With the wheels 114 powered, the propulsion supersystem 132 may be used to accelerate system 100, maintain the speed of system 100 (e.g., on level or uphill ground) and otherwise drive the system 100 along the ground. The propulsion supersystem 132 may also generate electrical energy using one, some or all of wheels 114, and consequently retard wheels 114 to decelerate the system 100, maintain the speed of the system 100 (e.g., on a downhill surface or road) and otherwise drive the system 100 along the ground. The retarding of wheels 114 may be used for regenerative braking, and the energy from the regenerative braking, may be stored for later use.

In addition to the energy supersystem 130 and the propulsion supersystem 132, the vehicle systems 120 may include one or more auxiliary systems 134. The auxiliary systems 134 may include a braking system 140, a steering system 142, a heating/cooling system 144, and/or an accessory system 146. The auxiliary systems 134, such as the propulsion supersystem 132, are electrically connected to the energy supersystem 130. The auxiliary systems 134 are operable to perform one or more auxiliary functions using electrical energy from the energy supersystem 130, including, but not, limited to frictional braking the system 100, steering the system 100, cooling the system 100, heating the system 100, and/or one or more accessory functions. Accordingly, although the propulsion supersystem 132 acts as the principal electrical load on the energy supersystem 130, the auxiliary systems 134 may also place electrical loads on the energy supersystem 130 and on individual parallel system of energy supersystem 130, as well.

As part of sensor system 122, system 100 may include one or more onboard sensors. The sensors monitor the system 100 in real-time. The sensors, on behalf of the sensor system 122, may to detect information about the system 100, including information about user requests and information about the operation of the system 100.

Sensor system 122 may include sensors for detecting the level and/or usage of hydrogen, water, and/or other compounds used in fuel or powering system 100. Sensor system 122 may detect the amount of charge remaining in one or more batteries, and/or the capability of one or more batteries to hold a charge.

System 100 includes user controls, via which user requests are sent and/or sensed (e.g., a shift, accelerator, brakes, controls for climate control, mirrors, and/or lights). The user controls serve as interfaces between users of system 100 and the system 100 itself, and may receive mechanical, verbal, and/or other user inputs requesting vehicle functions. In conjunction with corresponding user controls, and among the sensors, the system 100 includes an accelerator pedal sensor, a brake pedal sensor, a steering angle sensor, a shift sensor, one or more selector sensors, one or more microphones, and/or one or more cameras, for example. Relatedly, among information about user requests, the sensor system 122 may be operable to detect user inputs requesting powering the wheels 114, user inputs requesting braking, steering, and/or switching gears, for example; user inputs requesting heating, and/or cooling, for example; and/or user inputs requesting accessory functions, for example.

Also among the sensors of sensor system 122, the system 100 may include one or more speedometers, one or more gyroscopes, one or more accelerometers, one or more wheel sensors, one or more thermometers, one or more inertial measurement units (IMUs), and/or one or more controller area network (CAN) sensors, for example. Among information about the operation of the system 100, sensor system 122 may detect the location and motion of the system 100, including the speed, acceleration, orientation, rotation, and/or direction of system 100, for example; the movement of the wheels 114, the temperatures of the system 100; and/or the operational statuses of one, some or all of the vehicle systems 120, the batteries, and/or the motors of system 100.

As noted above, the processor system 124, the memory system 126 and the control modules 128 together serve as one or more computing devices whose control modules 128 orchestrate the operation of system 100. The control modules 128 include a global control module 128G. Global control unit 128G may include an electric hybrid vehicle electronic control unit (EHV ECU). As part of a central control system, system 100 may include a global control unit (GCU) to which the global control module 128G may belong. Global control unit 126B may apportion requests for power and/or torque between the parallel system of system 100 and/or between the main system of system 100 and one or more parallel systems of system 100, and Global control unit 126B may determine how much power and/or torque each parallel system and/or the main system each should produce. The control modules 128 may also include one or more power control modules 128P. Relatedly, the system 100 includes one or more power control units (PCUs) to which the power control modules 128P belong. Although the processor system 124 and the memory system 126 are shown as being common to the GCU and the PCUs, any combination of, or all of, the GCU and the PCUs may be standalone computing devices with one or more dedicated processor system 124 and dedicated memory system 126.

The global control module 128G orchestrates the global operation of the system 100, including but not limited to the operation of the vehicle systems 120, on behalf of the GCU. The power control modules 128P orchestrate the operation of the energy supersystem 130 and the propulsion supersystem 132, as well as certain auxiliary systems 146, on behalf of the PCUs.

Control modules P may include circuitry to control various aspects of the vehicle operation. Control modules 128P may include, for example, a microcomputer that includes a one or more processing units (e.g., microprocessors), memory storage (e.g., RAM, ROM, etc.), and I/O devices. The processing units of control modules 128 may execute instructions stored in memory to control one or more electrical systems or parallel systems in the vehicle. Control modules 128 can include a plurality of electronic control units (ECUs), such as an electronic engine control module, a powertrain control module, a transmission control module, a suspension control module, and/or a body control module (for example). As a further example, electronic control units may be included for controlling systems and functions such as doors and door locking, lighting, human-machine interfaces, cruise control, telematics, braking systems (e.g., ABS or ESC), battery management systems, and so on. The various control units can be implemented using two or more separate electronic control units or using a single electronic control unit.

In the example illustrated in FIG. 1, sensor system 122 receives information from a plurality of sensors included in system 100. For example, control modules 128P may receive signals that indicate vehicle operating conditions or characteristics, or signals that can be used to derive vehicle operating conditions or characteristics. The signals may include, but are not limited to accelerator operation amount, $A_{CC}$, a rotational speed, $N_{MG}$, of the motor system 166 (motor rotational speed), and vehicle speed, $N_V$. These may also include brake operation amount/pressure, B, battery SOC (i.e., the charged amount for one or more batteries of battery system 162 detected by an SOC sensor).

The processor system 124 may be any components configured to execute any of the processes described herein or any form of instructions to carry out such processes or cause such processes to be performed. The processor system 124 may be implemented with one or more general purpose or special purpose processors. Examples of suitable processor system 124 include microprocessors, microcontrollers, digital signal processors or other forms of circuitry that execute software. Other examples of suitable processor system 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry and/or controllers. The processor system 124 may include at least one hardware circuit (e.g., an integrated circuit) configured to carry out instructions contained in program code. In arrangements where there are multiple processor parallel systems within processor system 124, the parallel system of processor system 124 may work independently from each other or in combination with one another.

The memory system 126 is a non-transitory computer readable medium. The memory system 126 may include volatile or nonvolatile memory, or both. Examples of suitable memory system 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory system 126 includes stored instructions in program code. Such instructions are executable by the processor system 124 or the control modules 128. The memory system 126 may be part of the processor system 124 or the control modules 128, or memory system 126 may be communicatively connected the processor system 124 or the control modules 128.

Control modules 128 may control the electric drive components of the vehicle as well as other vehicle components. Control modules 128 may include machine instructions that may be executed by the processor system 124. The control modules 128 may be implemented as computer readable program code that, when executed by the processor system 124, execute one or more of the processes described herein. Such computer readable program code may be stored on the memory system 126. The control modules 128 may be part of the processor system 124 or may be communicatively connected the processor system 124.

As part of the vehicle systems 120 performing vehicle functions on behalf of the system 100 (to satisfy corresponding vehicle demands on behalf of the system 100), the energy supersystem 130 may perform energy functions (e.g., functions that involve generating and/or consuming energy), and thereby satisfy corresponding energy demands, the propulsion supersystem 132 is operable to perform propulsion functions, and thereby satisfy corresponding propulsion demands, and the auxiliary systems 134 are operable to perform auxiliary functions, and thereby satisfy corresponding auxiliary demands.

From the perspective of the global control module 128G and the power control modules 128P, and the orchestration of the global operation of the system 100, the vehicle demands include one or more global vehicle demands or, in other words, vehicle demands common to the system 100. Specifically, one or more of the energy demands may be global energy demands, and one or more of the propulsion demands may be global propulsion demands. The global energy demands may include any combination of one or more demands to generate electrical energy, one or more demands to store electrical energy, and one or more demands to store and otherwise handle fuel. The global propulsion demands may include one or more demands to power the wheels 114 and one or more demands to retard the wheels 114. Any combination of the global energy demands, and the global propulsion demands, may be part of global combined energy and propulsion demands, such as one or more demands to regeneratively brake the system 100. Any auxiliary demand may be a global auxiliary demand. The global auxiliary demands may include any combination of one or more demands to frictionally brake the system 100, one or more demands to steer the system 100, one or more demands to cool the system 100, one or more demands to heat the system 100 and one or more demands to perform accessory functions.

Beyond being equipped to satisfy the global vehicle demands by performing corresponding vehicle functions, the system 100 may be equipped to satisfy one or more vehicle demand requirements. Specifically, in relation to being operable to perform vehicle functions, and thereby satisfy corresponding global vehicle demands, the vehicle systems 120 have the capacity to satisfy vehicle demand requirements on behalf of the system 100. Accordingly, the energy supersystem 130 has the capacity to satisfy certain energy demand requirements, the propulsion supersystem 132 has the capacity to satisfy certain propulsion demand requirements, and the auxiliary systems 134 have the capacity to satisfy certain auxiliary demand requirements.

Vehicle demand requirements are specific to particular vehicle applications or vocations. In this specification a "vocation" refers to a specific end use and/or product made by the entire process or by the second entity or last entity (e.g., the OEM). For example, one vocation may be a beer truck (which may require refrigeration), another vocation may be a garbage truck, whereas another vocation may be passenger bus. For example, the system 100, as a semi-tractor application, has higher energy demand requirements and higher propulsion demand requirements than many other vehicle applications. In some cases, one vocation of system 100 may have multiple times the energy demand requirements and multiple times the propulsion demand requirements of another vocation.

For purposes of realizing the capacity to satisfy the energy demand requirements and the capacity to satisfy the propulsion demand requirements, the system 100 includes multiple power module main system 150A and parallel systems 150B (referenced generally using "power modules 150" or "power module parallel systems 150") whose vehicle elements are may be mechanically linked. In various embodiments, each power modules 150 is electrically isolated from other power module parallel systems. Although the system 100, as shown, includes two power module parallel systems 150A and 15B, in other embodiments, more than two power modules 150 may be included. In relation to the power modules 150, the energy supersystem 130 includes multiple energy main system 152A and parallel systems 152B (collectively energy systems 152) that may each have a corresponding main propulsion system 154A and sub propulsion system B (referred to collectively energy systems 154) in propulsion supersystem 132.

In each power system module 150, the propulsion system 154 and the energy system 152 may be electrically connected to one another. Moreover, the drivetrain is mechanically connected to each propulsion parallel system 154. Each energy system 152 may perform energy functions with which the energy supersystem 130 may be associated (e.g., on behalf of propulsion parallel systems 154), including but not limited to generating electrical energy. Similarly, each propulsion system 154 may perform propulsion functions (e.g., the power system module 150 to which it belongs and) with which the propulsion supersystem 132 is associated using electrical energy, including but not limited to powering the wheels 114. Each propulsion system 154 is, specifically, operable to perform propulsion functions using electrical energy from the energy system 152 of the power module system 150 to which it and the energy parallel system 152 belong.

Each energy parallel system 152, and the power module system 150 to which it belongs, may include a main fuel system A and one sub fuel system B (referred to collectively as fuel cell system 160), a main battery system 162A and sub battery 162B (referred to collectively battery system 162), and/or a main fuel tank system 164A (referred to collectively as fuel tank system 164) and sub fuel tank system 164B (referred to collectively as fuel tank system 164). Each propulsion system 154, and the power module system 150 to which it belongs, may include a motor system 166. Inside each power module system 150, the motor system 166 is electrically connected to the corresponding fuel cell system 160, so as to power the motor system 166. The battery system 162 and the corresponding fuel cell system 160 may be electrically connected to one another, so that the fuel system 160 may recharge battery system 162, and both may power the corresponding and the motor system 166. Additionally, battery system 162 may provide transient power demands, so that the corresponding a relatively constant power draw from the corresponding fuel system 160 while the fuel corresponding fuel system 160 is used for powering the corresponding motor system 166.

The motor(s) of motor parallel systems 166 can be powered by the battery (or batteries) of battery parallel systems 162 to generate a motive force to move the system 100 and adjust vehicle speed. The motor(s) of motor parallel systems 166 can also function as a generator to generate electrical power such as, for example, when coasting or braking. Battery parallel systems 162 may also be used to power other electrical or electronic systems in the vehicle. A given battery system 162 may have different power demands than other battery parallel systems 162 as a result of powering a different set of other electrical systems (e.g., it may be that one or more battery parallel systems 162 do not power any other electrical systems and/or that only one of battery parallel systems 162 powers all of the other accessory and/or auxiliary electrical parallel systems). A given motor of motor parallel systems 166 may be connected to a given battery of battery parallel systems 162, via an inverter. The batteries of battery parallel systems 162 may include, for example, one or more batteries, capacitive storage units, or other storage reservoirs suitable for storing electrical energy that can be used to power an electric power motor. The batteries of battery parallel systems 162 may be implemented using one or more batteries, the batteries can include, for example, nickel metal hydride batteries, lithium ion batteries, lead acid batteries, nickel cadmium batteries, lithium ion polymer batteries, and/or other types of batteries.

Control modules 128 may control an inverter to adjust driving current supplied to one or more motors of motor system 166, and adjust the current received from the motor during regenerative coasting and breaking. As a more particular example, output torque of the motor can be increased or decreased by control modules 128 through the inverter.

Fuel cell parallel systems 160 are fluidly connected to fuel tank parallel systems 164. Fuel cell parallel systems 160 may generate electrical energy using energy from the fuel from fuel tank system 164. In conjunction with the drivetrain, motor parallel systems 166 power the wheels 114 using electrical energy from any combination of fuel cell parallel systems 160 and battery parallel systems 162. The distribution of power generated by different power module parallel systems 150 and the distribution of power generated by each battery system 160 as compared to the corresponding fuel parallel system may be adjusted to extend the life of the battery parallel systems 160 and maintain an optimum durability and drivability of the system 100.

Battery parallel systems 162 may be provided by a first subentity (e.g., a first subentity of a manufacturer) may be provided to a second subentity (e.g., a second subentity of a manufacturer), which adds fuel cell parallel systems 160 and fuel tank parallel systems 164 to battery parallel systems 162 to form a kit that is provided to a second entity (e.g., an OEM). Control modules 128 may be communicatively connected to fuel parallel systems 160, battery parallel systems 162, fuel tank system 164, motor parallel systems 166, and/or other part so system 100 by the modular harness.

The motor parallel systems 166 may also generate electrical energy using the wheels 114, and consequently retard wheels 114. Battery system 162 may store electrical energy from the corresponding fuel cell system 160. Battery system 162 may store electrical energy from the corresponding motor system 166. Fuel tank system 164 is operable to store and otherwise handle fuel, including fueling the corresponding fuel cell system 160 with fuel. The power module parallel systems 150 may be "stacked" for purposes of realizing the capacity to satisfy the energy demand requirements and the capacity to satisfy the propulsion demand requirements of the system 100 to which they belong. Specifically, given an energy demand requirement, in each power module 150, the energy system 152 has the capacity to satisfy a share of the energy demand requirement. Power module parallel systems 150 to which the energy parallel systems 152 belong have the capacity to in combination satisfy the energy demand requirement, with the contribution of each energy parallel system being added together to fulfill the energy requirement of system 100. In various embodiments, the energy supersystem 130 has the capacity to satisfy the energy demand requirement of system 100 as well based on the contribution of each energy system 152. Similarly, given a propulsion demand requirement, in each power module system 150, the propulsion system 154 has the capacity to satisfy a share of the propulsion demand requirement of system 100. With the propulsion parallel systems 154 each having the capacity to satisfy a share of the propulsion demand requirement, power module parallel systems 150 to which the propulsion systems 154 belong have the capacity to contributorily satisfy the propulsion demand requirement. With the propulsion systems 154 likewise belonging to the propulsion supersystem 132, the propulsion supersystem 132 has the capacity to satisfy the propulsion demand requirement as well. In an embodiment, one or more of energy parallel systems 152 may be able to power system 100 alone, for at least short duration of time and optionally on a continuous, ongoing, and/or long-term basis.

Given a global energy demand, in each power module 150, the energy system 152 may be operable to satisfy a share of the global energy demand. With the energy systems 152 each operable to satisfy a share of the global energy demand, the power module parallel systems 150 to which the energy parallel systems 152 belong may be operable to contributorily satisfy the global energy demand. With the energy parallel systems 152 likewise belonging to the energy supersystem 130, the energy supersystem 130 is operable to satisfy the global energy demand as well. Similarly, given a global propulsion demand, in each power module 150, the propulsion system 154 may be operable to satisfy a share of the global propulsion demand. With the propulsion parallel systems 154 each operable to satisfy a share of the global propulsion demand, the power module parallel systems 150 to which the propulsion systems 154 belong are operable to contributorily satisfy the global propulsion demand. With the propulsion systems 154 likewise belonging to the propulsion supersystem 132, the propulsion supersystem 132 is operable to satisfy the global propulsion demand as well.

Although vehicle demand requirements are specific to particular vehicle applications, some vehicle demand requirements are less vocation-dependent than others, and a semi-tractor vocation (for example), may still have similar auxiliary demand requirements as many other vehicle vocations.

In various embodiment system 100, the auxiliary systems 134 perform functions that are common to the system 100, rather than having multiple parallel system relationships, In relation to the power module parallel systems 150 and the energy supersystem 130, one or more of the auxiliary elements, either individually or as part of the auxiliary systems 134 to which they belong, are assigned to the power module parallel systems 150. At each power module system 150, each assigned auxiliary element, either individually or as part of the auxiliary system 134 to which it belongs, as the case may be, is electrically connected to at least one of the energy parallel systems 152. On behalf of the system 100 and the auxiliary system 134 to which a given one of power module parallel systems 150 belongs, each assigned auxiliary element is operable to perform auxiliary functions using electrical energy from at least one of the energy parallel systems 152. Accordingly, in each power module system 150, although the propulsion system 154 acts as the principal electrical load on the energy system 152, the assigned auxiliary elements act as electrical loads on the energy system 152 as well. However, given a global auxiliary demand, the assigned auxiliary elements are operable to satisfy the global auxiliary demand on an unassigned basis.

As noted above, the power control modules 128P orchestrate the operation of the energy supersystem 130 and the propulsion supersystem 132, as well as certain auxiliary systems 146. Power control modules 128P is used to collectively refer to main control module 128P-A and subcontrol module 128P-B. Power control module 128P Specifically, in relation to the arrangement of the energy supersystem 130 and the propulsion supersystem 132 across the power module parallel systems 150, the system 100 includes multiple parallel system power control modules 128P (e.g., parallel system power control modules 128P-A and 128P-B). In the system 100, each power control module 128P is assigned a power module 150. With each power module 150 including an energy system 152 and a propulsion system 154, each power control module 128P is assigned an energy system 152 and a propulsion system 154. Moreover, one or more power control module 128P may also be assigned control over auxiliary elements. Specifically, one or more power control module 128P may be assigned the auxiliary elements assigned to the power module 150 that, in turn, may be assigned to the power control module 128. Each power control module 128 orchestrates the operation of the assigned power module 150, including the operation of the assigned energy system 152 and the operation of the assigned propulsion system 154, as well as the operation of the assigned auxiliary elements.

To facilitate modularization, each power module 150 may be sourced from another vehicle application, such as a passenger car application, with lower energy demand requirements and lower propulsion demand requirements than the system 100. Specifically, each power module 150 may be a modularized version of a complete energy system or a complete propulsion system from or for another vehicle application. Relatedly, each power control module 128P may be sourced from the other vehicle application as well. Specifically, each power control module 128P belongs to a PCU sourced from the other vehicle application as a standalone computing device with one or more dedicated processors and dedicated memory, in addition to the power control module 128P itself.

In an embodiment, any combination of the fuel cell system 160, the battery system 162 and the fuel tank system 164 of one power module 150 could have the same capacity 164 to satisfy energy demand requirements as their parallel systems of the remaining power module 150. Additionally, or alternatively, the motor system 166 of one power module 150 could have the same capacity to satisfy propulsion demand requirements as its parallel system of the remaining power module 150.

Beyond the specific embodiments illustrated in FIG. 1, across a broader vehicle lineup, for new vehicle applications, multiple of the same or similar power module parallel systems 150 could be stacked for purposes of realizing the capacity to satisfy the energy demand requirements and the capacity to satisfy the propulsion demand requirements of the new vehicle applications. One or more vehicle elements of the power module parallel systems 150 could be standardized across the vehicle lineup. For instance, in every power module 150, the fuel cell system 160 could be the same. Additionally, or alternatively, one or more of the power control modules 128P could be the same. With the standardized vehicle elements having the same capacity to satisfy vehicle demand requirements regardless of the vehicle demand requirements of the new vehicle applications, only singular, single-capacity standardized vehicle elements need to be and produced, and new or different demand requirements can be accommodated by changing the number of vehicle elements that are stacked to meet a particular demand. Relatedly, beyond the standardized vehicle elements, the remainder of the power module parallel systems 150 could be optimized for new vehicle applications. For instance, when, in every power module 150, the fuel cell system 160 is the same, the battery systems 162 of the power module parallel systems 150 could be optimized to have the capacity to contributorily satisfy the energy demand requirements of new applications. Additionally, or alternatively, the motor systems 166 of the power module parallel systems 150 could be optimized to have the capacity to contributorily satisfy the propulsion demand requirements of new vehicle applications.

Since the modules are easily integrated into new vehicle applications, the power module parallel systems 150 are useful beyond initial vehicle development and production. For instance, in an end-of-life (EOL) scenario for the system 100, a power module 150 may no longer have the capacity to contributorily satisfy the energy demand requirements of the system 100. Additionally, or alternatively, the power module 150 may no longer have the capacity to contributorily satisfy the propulsion demand requirements of the system 100. The power module 150 may nonetheless have the capacity to contributorily satisfy the energy demand requirements and the capacity to contributorily satisfy the propulsion demand requirements of another vehicle application. Accordingly, instead of disposing of the power module 150, it could be integrated into the other vehicle application. Similarly, if a OEM changes their specifications for a vehicle (e.g., changes the size of the chassis, the type of fuel cell, the number of power systems, parts only need to be removed from, added to, and/or swapped with the original configuration to arrive at the new configuration).

In an embodiment, the power generation system, which is the fuel cell system 160, the hydrogen storage system of the fuel tank system 164 (which may be the fuel tank system 164 in an all hydrogen fuel cell-hybrid electric vehicle), optionally a harness, the battery system 162 (or at least the high voltage battery system of the battery system 162), are supplied by the manufacturer (e.g., as a kit), and the auxiliary systems 134 are supplied by the OEM (the manufacturer being a first subentity). In this specification, the term "high voltage" refers to voltages that are appropriate for driving motors that turn a shaft for propelling or driving system 100. For example, in an embodiment, a high voltage battery system may have a 650 Volt voltage drop (in other embodiments other voltages may be used, such as 1200 volts). Similarly, low voltage refers to a voltage that is appropriate for running accessories of system 100, such as lights (e.g., 12 volts). In an embodiment, the OEM is responsible for mechanical connections. In an embodiment, the OEM (a first subentity) has an option as to whether to purchase motor system 166 (and or other components) from the manufacturer.

In other embodiments, the breakdown between which parts are provided by different entities, subentities, and/or the manufacturer and which parts are provided by the OEM may be different. In an embodiment, the fuel cells are provided by one entity of the manufacturer (or a first manufacturer or a first subentity of the first entity), whereas the high voltage battery, hydrogen storage, and the optional motor-transmission system is provided by another entity of the manufacturer (or a second manufacturer or a second subentity of the first entity). In other embodiments there may be more than just 2 entities and/or fewer or more than two subentites (e.g., there may be multiple OEMs, multiple entities within any given OEM, multiple manufacturers and/or multiple entities with any given manufacturer).

Figure 2:
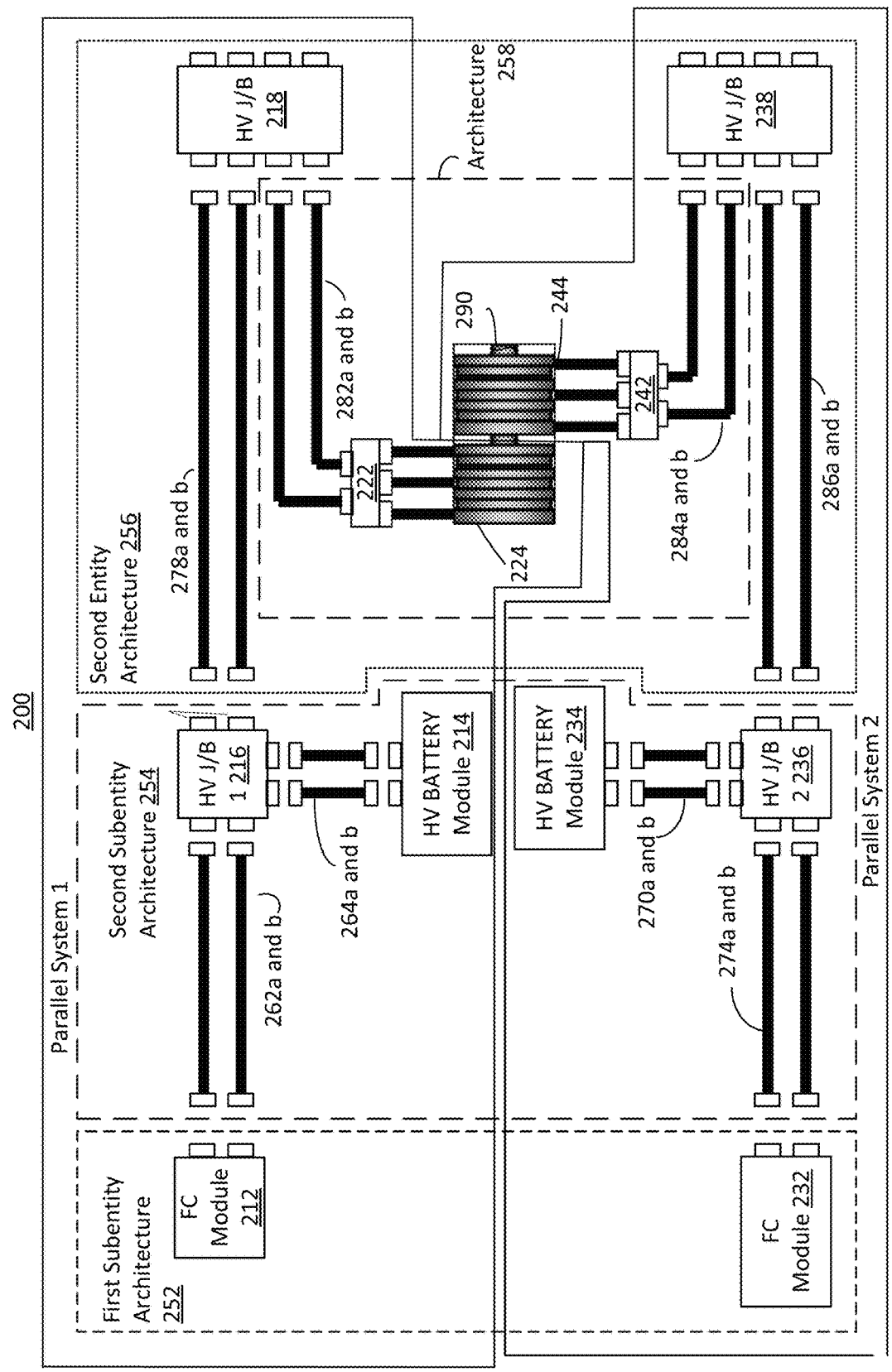
FIG. 2 illustrates various embodiments of a high voltage system, which may be used in the system of FIG. 1.

FIG. 2 is a diagram illustrating a high voltage system 200. FIG. 2 illustrates which parts of high voltage system 200 are provided by first subentity of the first entity, second subentity of the first entity, and the second entity (in the example of FIG. 2, the first subentity of the first entity and the second subentity of the first entity together form the first entity). High voltage system 200 is an example modular fuel cell powertrain architecture for a fuel cell vehicle, which allows for mass production for a wide array of OEM vocations. High voltage system 200 is an embodiment of how portions of control modules 128A and B, fuel cell system 160A and B, battery system 162A and B, motor system 166A and B, and may be connected together into separate, but parallel systems. More specifically, the modular fuel cell system architecture of high voltage system 200 allows the second entity (e.g., an OEM) to add or subtract fuel cell modules from the fuel cell vehicle's powertrain system with minimal modification to system architecture provided by the first entity.

In the example of FIG. 2, modular fuel cell powertrain architecture of system 200 contains two parallel systems, system 1 and parallel system 2. Either of parallel systems 1 or 2 may be the main system. Parallel system 1 may include fuel cell (FC) module 212, high voltage (HV) battery module 214, power generation side high voltage junction box 216, power consumption side high voltage junction boxes (HV J/B) 218, electrical inverter 222, and electric motor 224. Parallel system 2 may include fuel cell module 232, high voltage battery module 234, power generation side high voltage junction box (HV J/B) 236, electrical inverter 242, and/or electric motor 244.

Fuel cell modules 212 and 232 may be part of fuel cell system 160. Fuel cell module 232 may be a of different type than fuel cell module 212. For example, one fuel cell module may have a polymer electrolyte membrane (PEM) fuel cell and the other fuel cell may have fuel cells that are direct methanol fuel cells. High voltage battery modules 214 and 234 may be part of battery system 162. Electrical inverter 222, electric motor 224, inverter 242, and electric motor 244 may be part of motor parallel system 166. However, fuel cell module 212, high voltage battery module 214, electrical inverter 222, electric motor 224 are part of power module 152A, whereas fuel cell module 232, high voltage battery modules 234, inverter 242, and electric motor 244 may be part of power module 152B. Power distribution system 220 and power distribution system 240 may be part of power control module 128A and B, respectively.

The high voltage portions of parallel systems 1 and 2 may be electrically isolated from one another (but parallel systems 1 and 2 may share a common control system). For example, fuel cell module 212, high voltage battery module 214, power generation side high voltage junction box 218, may be electrically isolated from fuel cell module 232, high voltage battery module 234, power generation side high voltage junction box 238, power consumption side high voltage junction box 238. Parallel systems 1 and 2 may independently power their respective motors 224 and 234, which in turn may turn drive shaft 290. Although in the examples of FIG. 2 and rest of the specification may illustrate only two parallel systems, as an example, there may be any number of parallel systems. In an embodiment, each parallel system is kept electrically isolated from the other parallel systems.

Driving force power generated by the fuel cell module 212 and/or high voltage battery module 214 may be transmitted to motor 224, which in turn is transmitted to one or more wheels. Optionally, the power is transmitted to the wheels, via a transmission, a differential gear device, and a pair of axles.

In accordance with various embodiments, fuel cell modules 212 and 232 may be used to provide motive power during driving, electrical power to various vehicle accessories (e.g., vehicle lights), and/or in some cases/modes of operation, fuel cell modules 212 and 232 may be responsible for charging high voltage battery modules 214 and 234, respectively.

In various embodiments, the high voltage battery modules 214 and 234 may assist fuel cell modules 212 and 232, respectively, during vehicle start up and acceleration. In particular, high voltage battery modules 212 and/or 232 may be used to power system 100 during transient loads. When a fuel cell is subject to transient loads, the transient load may cause plating of the membranes of the fuel cell. In one embodiment, control logic is provided to change whether the fuel cell modules 212 and 232 provide power directly to the motors 222 and 242, respectively. Thus, for example, during a transient power demand (e.g., during acceleration or startup), fuel cell modules 212 and 232 may provide power to high voltage battery modules 214 and 234, and high voltage battery modules 214 and 234 may then power the motor 222 and 242, respectively, whereas while cruising at a constant velocity on level ground (for example), fuel cell modules 212 and 232 may provide power to the motors 222 and 242, directly, and optionally to the high voltage battery modules 214 and 234 (so that high voltage battery modules 214 and 234 can essentially always provide a relatively constant amount of power and does not need to meet a transient power demand). In an alternative embodiment, fuel cell modules 212 and 232 may never directly power the motors 222 and 232, but fuel cell modules 212 and 232 may provide power to high voltage battery modules 214 and 234, which in-turn power the motors 222 and 232, respectively.

In the illustrated example embodiment of FIG. 2, each parallel system includes two sources of electrical power generation (e.g., for sub system 1, fuel cell module 212 and high voltage battery module 214 and fuel cell module 212) that may be configurable (e.g., via relays) to be connected in parallel at some times and in series at other times. Although in FIG. 2, the fuel cells electric power is used for driving the motors of vehicles, in other embodiments, other sources of electrical power may be used instead and/or other types of systems may be powered.

Parallel systems 1 and 2 may independently power their respective motors 224 and 244, which both in-turn may turn drive shaft 290.

Junction boxes 216 and 236 separate the architecture of high voltage system 200 into a portion that is supplied by the first entity and a portion that is provided by the second entity. By separating the high voltage system 200, via junction boxes 216 and 236, the first entity (e.g., the manufacturer) can ship the portion created by the first entity to the second entity, with junction boxes 218 and 238 connected to the first entity's side (e.g., the manufacturer's side) of the architecture of high voltage system 200, and the second entity (e.g., the OEM) only needs to plug electrical components of the second entity (e.g., the OEM) portion of high voltage system 200 into junction boxes 218 and 238 to communicate power and data between the side of the first entity (e.g., the manufacturer's side) of the architecture of high voltage system 200 and the second system (e.g., OEM) side of the architecture of high voltage system 200. In addition, parallel systems 1 and/or 2 may be utilized to power various vehicle accessories (e.g., vehicle lights, power take offs, etc.), connected to the second entity (e.g., OEM) side high voltage junction boxes 218 and 238. High voltage junction boxes 218 and 238 may be used by the second entity (e.g., OEM) as a power source for powering accessories. If the second entity (e.g., OEM) needs a low voltage, the second entity (e.g., OEM) may step down the voltage, (e.g., using a buck converter). By providing a high voltage source to the second entity (e.g., via high voltage junction boxes 216 and 236), the second entity (e.g., OEM) is given more flexibility in terms of voltage and current that are available to the second entity (e.g., OEM) for meeting various vocations (whereas if a low voltage source were provided, the second entity (e.g., OEM) might not be able to get as many combinations of both combinations of both high current and high voltages).

Inverters 222 and 242 are capable of conditioning electrical energy from fuel cell modules 212 and 232, respectively. Inverters 222 and 242 are capable of conditioning electrical energy from high voltage battery modules 214 and 234. Specifically, inverter 222 may convert DC electrical energy from the fuel cell module 212 and/or high voltage battery module 214 into AC electrical energy, which may be high voltage electrical energy. Inverter 242 may convert DC electrical energy from the fuel cell module 232 and/or high voltage battery module 234 into AC electrical energy, which may be high voltage electrical energy.

The first subentity architecture 252 may be produced by the first subentity (e.g., the first subentity of manufacturer 1), which may include fuel cell module 212, and fuel cell module 232. The second subentity architecture 254 may be produced by the second subentity of the first entity (e.g., the second subentity or the manufacturer or Manufacturer 2), which further may include high voltage junction box 216. High voltage junction box 216 attaches, via lines 262 a and b to fuel cell module 212, and, via lines 264a and b, to high voltage battery module 214. In this specification, each "line" may include multiple electrical connections (e.g., wires) that have different purposes, which are used to transmit power, control signals, and/or data between the module for which the line is adapted for and other parts of the system. High voltage junction box 216 may also connect to high voltage junction box 230. Similarly, high voltage junction box 236 attaches, via lines 274 a and b to fuel cell module 232 (which may be a stack of fuel cells) of and, via lines 270a and b, to high voltage battery module 234. High voltage junction box 236 may also connect to high voltage junction box 238. For the sake of keeping high voltage system 200 modular, high voltage junction boxes 216 and 236 may only have a limited number of connections, which may only be adequate for connecting one or two devices or another junction box (e.g., junction boxes 218 and 238). Lines 278 and b and 286 and b connect junction boxes 216 and 236 to junction boxes 218 and 238, there by power junction boxes 218 and 238, respectively. Lines 282a and b and lines 284a and b bring power form junction boxes 218 and 238 to motors 224 and 244, respectively thereby transmitting power between motors 224 and 244 and first subentity architecture 252 and second subentity architecture 254.

By using junction boxes 218 and 238 to split the voltage from junction boxes 216 and 236, first subentity architecture 252 and second subentity architecture 254 can be used for a variety of different vocations. The first subentity and first subentity do not need to know what vocation first subentity architecture 252 and/or second subentity architecture 254 will be used for, and only the second entity needs to be concerned with the details of the junction box needed to support the vocation determined by the second entity.

The second entity (e.g., OEM) may use high voltage junction boxes 218 and 238 to connect the second entity architecture 256 to the second subentity architecture 254 (and thereby to the combination of the first subentity architecture 252 and second subentity architecture 254, so that FC modules 212 and 232 and/or HV batter modules 214 and 234 may send power to inverters 222 and 243, respectively). High voltage junction boxes 218 and 238 may be used to connect inverters 222 and 242, respectively, which in turn connect to motors 224 and 244, respectively, which in turn connect to motors 224 and 244 (which turn a shaft). Inverters 222 and 242 and motors 224 and 244 form architecture 258.

Architecture 258 is a portion of the system that the second entity has an option to receive from the first subentity or is a portion of a system formed by the combination of the first subentity and/or the second entity (the OEM). High voltage junction boxes 218 and 238 may also connect to, and power, auxiliary systems 134. Optionally, high voltage junction boxes 216 and 218 may be combined into one junction box and high voltage junction boxes 236 and 238 may be combined into one junction box.

Figures 3A, 3B:
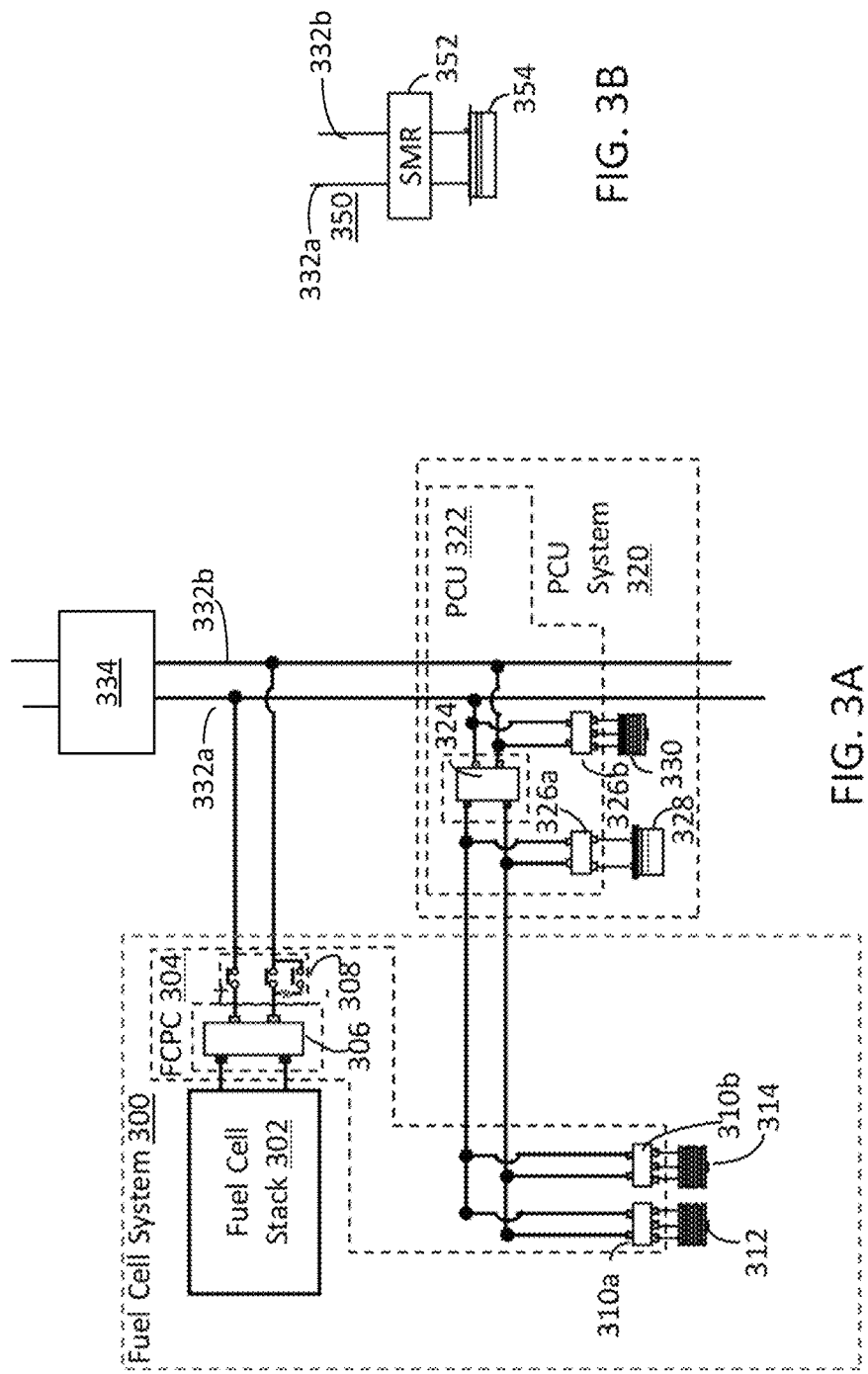
FIG. 3A illustrates various embodiments of a combination of fuel cell system and power control system that may be used together or separately within the high voltage system of in FIG. 2.
FIG. 3B illustrates various embodiments of a high voltage system that may be used in the high voltage battery system of FIG. 2.

FIG. 3A illustrates various embodiments of fuel cell system 300 and power control unit (PCU) system 320. Fuel cell module 212 and/or 232 may both individually include different copies of fuel cell system 300 and PCU system 320. Fuel cell system 300 may include fuel cell stack 302 and fuel cell power control (FCPC) 304. FCPC 304 may include FC boost converter 306, FC relay 308, converter 310a and b, hydrogen pump 312 and water pump 314. Power control unit (PCU) system 320 may include PCU 322, buck converter 324, DCDC converters 326a and b, low voltage battery 328, compressor 330, and lines 332a and b, and/or power distribution system 334.

Fuel cell system 300 may be an embodiment of fuel control system 216 and/or fuel control system 236. Fuel cell stack 302 is a stack of one or more fuel cells, which individually contribute power to turning shaft 290 (FIG. 2), recharging battery systems 214 and 234, powering accessory system 134, and/or powering accessory system 146. FCPC 304 controls how much power is provided by fuel stack 302, and/or whether the power is used powering the one motor 224 or 244 to which fuel stack 302 is connected, and/or for recharging the one of battery module 214 or 234 to which fuel stack 302 is connected. Boost converter 306 increases the voltage output by fuel cell stack 302, so that fewer cells are needed to power the vehicle. FC relay 308 controls whether or not the fuel cell stack 302 is connected to the power lines for powering the electric motor and/or for charging the batteries (e.g., high voltage battery modules). DCDC converter 310a and b convert the voltage from PCU 320 of PCU system 320 to a voltage needed for hydrogen pump 312 and water pump 314, respectively. Hydrogen pump 312 provides hydrogen to fuel cell stack 302, which is used for producing power. Water pump 314 may pump water produced by fuel cell stack 302, to remove the water produced from the vicinity of fuel cell stack 302. FCPC 304, PCU system 320, and PCU 322 may be part of main control module 128A, and/or subcontrol module 128B.

Buck converter 324 is connected to the power lines, drawing power from the high voltage battery module 214 or 232, and buck converter 328 reduces the voltage from the high voltage battery module 214 or 232 and/or fuel cell stack 302 to a lower voltage. The power from buck converter 324 is applied to DCDC converters 310 a and b, and/or 326a, for powering the hydrogen pump 312, powering water pump 314, and/or for charging low voltage battery 328. DCDC converter 326b may convert voltage from the high voltage battery module 214 or 232 and/or from fuel stack 302 to a lower voltage for running air compressor 330. Air compressor 330 pumps air to fuel cell stack 302, which uses the oxygen in the air as fuel, by combining the oxygen with hydrogen (supplied by hydrogen pump 312) to create water, and thereby releasing energy as part of the reaction that creates the water that is pumped, and thereby removed, by water pump 314. Lines 332 a and b connect to fuel cell system 300, via relay box 308, and to PCU 322, via buck converter 324, and DCDC converter 326b. Lines 332 a and b carry power from fuel cell stack to the motors 224 or 244, hydrogen pump 312, water pump 314, low voltage battery 328, and/or air compressor 330. Lines 332 a and b may include lines 262 a and b, 264 a and b, 270 and b, 274 and b, 278 a and b, 282 and b, 284 a and b and/or 286 and b.

Power distribution system 334 may be connected to both parallel system 1 and 2 (and any other parallel systems), and power distribution system 334 may send control signals to relay box 308 to determine when fuel cell stack 302 is connected to the rest of system 100, powers motor 224 or 244, and/or charge battery system 214 or 234. Power distribution system 334 may determine the contribution of each of parallel systems 1 and 2 to the total power and/or total torque. Power distribution system 334 may be part of global control module 128G.

FIG. 3B illustrates high voltage battery system 350, which may include system main relay (SMR) 352 and high voltage battery 354. Fuel cell module 212 and/or 232 may both individually include a copy of high voltage battery system 350. SMR 352 connects and disconnects high voltage battery 354. Battery system 350 may be part of the same parallel system as fuel cell system 300. SMR 352 may connect high voltage battery system, via lines 332 a and b, to motor 222 or 242. During acceleration and/or deceleration (and/or at other times), high voltage battery 354 may assist fuel cell stack 302 in powering, via lines 332 a and b, motor 222 or 242. During regenerative breaking, SMR 352 may keep high voltage battery 354 connected, via lines 332 a and b, to the power lines for charging high voltage battery 354. Power distribution system 334 may determine the contribution of battery system 350 and of the contribution of fuel cell stack 302 to the power provided by the FIGS. 3A and B parallel system to motor 224 or 244.

FIG. 4 illustrates system 400, which may include part provided by a supplier 490, which may include transmission 492. System 400 may also include differential 494, and wheels 496 and 498 (which may be provided by the second entity). Supplier 490 may be either the first entity (e.g., the second subentity of the first entity) or the second entity. Transmission 492 provides the control over the rotational speed of shaft 290 and determines the transfer of the torque to shaft 290, which interacts with the differential 494, which in-turn turns the wheels 496 and 498. Transmission 492 and differential 494 may be attached to shaft 290 (see FIG. 2). Differential 494 allows wheels 496 and 498 to turn at different rates, when needed, such as when turning. Wheels 496 and 498 may be an embodiment of any of wheels 114 (see FIG. 1).

FIG. 5 illustrates a diagram of a system 500, which may be an embodiment of system 100 and high voltage system 200. In an embodiment, system 500 includes controls that optimize a power split between different modules, so as to optimize the efficiency, durability, and performance of the fuel cell (FC) system (or another vehicle system). The system 500 may be included in heavy duty electric trucks using multiple fuel cells and batteries and/or other vehicles, for example. Second entity 510 side is the part of the system provided by (e.g., built by) the OEM.

Interface

Requests for power and torque are generated in the OEM side 510 of system 500 and the transmission. Shift 512 is the of shift the vehicle of system 100. The direction of the required requested and whether or not torque is requested is controlled, at least in-part, by whether the shift is in reverse, forward, neutral, and/or park. Similarly, the shift 512 often includes a request for control over one or more gears of transmission 492 for different speeds, for steep inclines and/or for other situations where a greater amount of power may be necessary to travel at a given speed. There may be multiple gears for moving forwards and/or there may be multiple gears for moving in reverse. The amount of energy and/or power required to generate a particular amount of torque, depends on the gear to which shift 512 is set, and consequently, shift 512 affects the conversion factor between converting torque requests to power requests and the conversion factor between power requested and the amount of torque that will be obtained. Accel pedal 514 is the accelerator pedal which provides a request for a finer degree of choice than shift 512, and/or accel pedal 514 provides a request that may be selected from a relatively continuous range of torque and/or power for the sake of changing or maintain a particular speed. The brake pedal 516 creates a request to reduce the amount of torque provided and/or to stop providing any torque, so as to stop or slow down. The signals from the shift 512, accelerator pedal 514, and brake 516 may be sent to an AC to DC converter 518 to convert the signal for AC to DC electricity, and then may be sent to signal combiner 520.

Signal combiner 520 generates a signal indicative of the appropriate amount of toque to request. Signal combiner 520, determines the signal to generate (e.g., determines how much torque and/or power to request), based on signals form the shift 512, accelerator pedal 514, and/or brake 516. The amount of torque to request may also depend on the current speed of the vehicle and/or the current torque being supplied, because, at least some of the time, less torque and/or power may be required to maintain a particular speed than to obtain a that speed. Signal combiner 520 creates user torque request 522, which is a request for a particular amount of torque that is estimated to be needed for running the vehicle the in the manner requested. In various embodiments, signal combiner 520 may implement the following algorithm. Signal combiner 520 may make a determination of the state of shift 512. If shift 512 is in a no-torque state, such as park or neutral, no torque is requested. If shift 512 is not in a no-torque state, a signal combiner 520 may make a determination as to whether shift 512 is in a gear for moving forward or in a gear for moving in reverse, and a torque that moves the vehicle forward will be requested if shift 512 is in a gear for moving forwards and a torque that moves the vehicle backward will be requested if shift 512 is in a gear for traveling in reverse. Next, signal combiner 520 may determine which forward gear or backward gear the vehicle is in to determine a conversion between the power requested and the torque requested. Next signal combiner 520 may determine the state of the accel pedal 514 and/or break 516 to determine how much power is being requested. In an embodiment, the more pedal 514 is depressed the more power is requested. In an embodiment, if pedal 514 is not depressed only enough power to maintain an idle state of the motors is requested (the idle state may be a rotational speed of the shaft that is appropriate for when the vehicle is not moving, e.g., when the vehicle is waiting a traffic light). If break 516 is depressed, the amount of power requested may be reduced, optionally to that of the idle state. Next, signal combiner 520 may convert the power request to a torque request, using a power to torque conversion factor that is based on which gear, shift 512 is currently in.

Similarly, HVAC 524 is a signal that requests heat, ventilation (which may involve running a fan), air conditioning, and/or other climate controls, effectively requests power to adjust the climate according to the user's comfort. Other accessories 526 may include a radio, lights, a navigation system, a refrigeration system, electrically powered windows, and/or any other accessories, for example. When activated, other accessories 526 also request electrical power for running the accessories. Request for electrical power of HVAC 524 and other accessories 526 are sent to electrical signal combiners 528 and 530, respectively. Signal combiner 528 combines the signal from HVAC 524 with a signal indicative of the maximum power available for climate control, and signal combiner 528 may place a limit on how much power can be diverted from one or more the parallel systems of system 500 to climate control, based on the current state of the power generation system. The output of signal combiner 528 may be sent to an A/C air compressor 532, and A/C air compressor, if air conditioning was requested, which draws an appropriate amount of power from one or more the parallel systems of the power generation system to run compressor 532. Signal combiner 530 combines the signal from other accessories 526 with a signal indicative of the maximum power available for the other accessories. Signal combiner 530 then sends the signal to DCDC inverter 534 to draw the amount of power necessary for the accessories that are powered by one or more of the parallel systems. DCDC converter 534 draws an appropriate amount of power from one or more of the parallel systems of the power generation system based on the power requested by other accessories 526 and the signal indicative of the maximum amount of power available limit of the how much power. In the embodiment of system 500, the total power may be requested by an original equipment manufacturer (OEM) using the interface of system 500.

Shift 512, accel pedal 514, brake pedal 516, HVAC 524, and/or other accessories 525, together, form a user interface, via which the driver (and/or other user) requests power from system 500. In an embodiment, total power requested by the user is determined by the interface formed by shift 512, accel pedal 514, brake pedal 516, HVAC 524, and/or other accessories 525. AC/DC converter 518, signal combiner 520, electrical signal combiners 528 and 530, further modify the power request, whereas A/C compressor 532 and DC/DC converter 534 draw power from one or more of the parallel system of system 500, which may limit the available power for fulfilling torque requests by the parallel systems from which the power was drawn. Since accessories may draw power from some of parallel systems (e.g., from just one or more parallel systems), but not draw any power from other parallel systems, the parallel systems may not have an equal amount of power available for generating torque (assuming if each of the parallel systems would otherwise have the same capacity for generating power), and may inherently have different amounts of power available for torque request and/or other purposes.

Power Distribution Logic

First entity 536 is the logic for controlling the power generation, which may be supplied by the first entity. Power distribution module 334 may incorporate the logic provided as first entity 536. Signal combiner 536 consolidates the user toque request 522 with a signal from the transmission to produce a consolidated torque request 538. There may be certain conditions during which the transmission needs to request more torque, such as when switching gears when accelerating past a particular speed. When one of the conditions occurs at which the transmission needs to switch gears or request more torque, the request from the transmission may override the request for torque from the user. The result of the determination of whether to send the user requested torque or the torque requested by the transmission is consolidated torque request 538. Consolidated torque request 538 is sent to split 540. Split 540 determines how much torque should be provided by each of the parallel systems and/or determines what percentage of the total torque requested each parallel system should provide. There may be multiple factors that determine what percentage of the torque is provided by each parallel system. For example, the power for the accessories may be drawn from one of the parallel systems, which may leave less power available to that parallel system for providing torque.

There may be competing optimization objectives between drivability and durability. For example, parallel system B may have a battery that needs to be recharged, and the power balance determined by split 540 may have parallel system A shoulder more of the load in order to protect parallel system B's battery, which may adversely affect drivability. In an embodiment, split 540 may rank performance targets for the vehicle. Split 540 use each parallel system as a degree of freedom that can be modulated in order to optimize drivability, durability, proper battery management, efficiency, and/or performance (e.g., while maintaining or optimizing safety).

Split 540 makes at least an initial determination as to how to allocate power between the different parallel systems, and a signal torque request 542*a* is produced and is sent to limit 544, which determines whether to further limit the amount of torque to request from a particular parallel system (e.g., parallel system A). Limit 544 also receives which is a signal indicative of the maximum available power of the current parallel system and the minimum power that is safe to run the current parallel system without causing damage to the current parallel system. If the torque requested by torque request signal 542*a* from split 540 is higher than the maximum, a feedback signal 542*b* is sent to split 540, which directs split 540 to recompute how to distribute the torque request between the parallel systems, and optionally, the maximum available torque may be requested by limit 544 and/or a signal may be sent from limit 544 to split 540 (that is, split 540 may—e.g., completely—recompute how to redistribute the power request between all the parallel systems or may only recompute how to distribute the power between the other parallel system and limit 544 may send a power request for the maximum available power to, as power request 546). Similarly, if the torque requested by the signal 542*a* from split 540 is lower than the minimum torque, then feedback signal 542*b* is sent to split 540, which directs split 540 to recompute how to distribute the torque request between the parallel systems, and optionally, the minimum torque may be requested by limit 544 (that is, split 540 may—e.g., completely—recompute how to redistribute the power request between all the parallel systems or may only recompute how to distribute the power between the other parallel system and limit 544 may send a power request for the minimum allowed power request to, as power request 546). The output of limit 544 may be torque request 546, which is a request for the amount of torque determined by limit 544, and which is sent to an inverter for requesting torque from parallel system A. Torque request 546 is also sent to torque-to-power 548, which is a module that converts the torque request into a request for an amount of power that will generate the requested torque. To make the conversion, the amount of torque requested for a unit change in angle of the rotor is computed, and the result may be multiplied by the expected efficiency of the motor in converting electrical power into torque. The output of torque-to-power 548 is power requested 550, which is sent to FC/Battery balance 552. In an embodiment, prior to sending torque request 546 to sub system A, power requested 550, may perform further computations to determine whether power request 546 is acceptable, and if power request 546 is not acceptable, spit 540 recomputes the torque and/or power distribution. FC/battery balance 552 may check whether each power request 546 individually and/or whether all of the power requests when combined into a power distribution is acceptable. In various embodiments, various checks for whether a power distribution is acceptable may be performed by split 540, limit 544, and/or FC/battery balance 552.

FC/Battery balance 552 may determines an appropriate balance between the power supplied by the battery system of a given parallel system and the power supplied by the fuel cell system of the same given parallel system, based on input from the battery and fuel cell of the current parallel system. For example, FC/Battery balance 552 may decide whether some of the power from the fuel cell should be used for recharging the high voltage battery. FC/battery 552 may produce the signal max/min power A 554, which is a signal that includes an indication of the maximum available power of the current parallel system (e.g., parallel system A) and the minimum safe power at which to operate the current parallel (e.g., to avoid cycling between the parallel system toggling on and off). The maximum/minimum power signal 554 may be sent to signal combiners 528 and 530, so as to limit the power requested for the climate control and/or other accessories, if necessary. The maximum/minimum power signal 554 may also be sent to power-to-torque 556, which is a module that converts a request for power into a request for torque. The conversion may include dividing the power requested by a unit of angle of revolution of the rotor of the motor. The result of the dividing the power requested by a unit of angle of revolution may then optionally be multiplied by an efficiency of the motor of the current parallel system in converting torque to power. The output of the power-to-torque 556 may be maximum/minimum torque A 558, which is a signal indicating the maximum torque available to request from the current parallel system (e.g., parallel system A) and the minimum torque that is safe to request from the current parallel system. Maximum/minimum torque 558 is sent to limit 544, which is used to determine whether the torque request from split 540 is between the maximum and minimum thresholds determined from Maximum/minimum torque A 558 (and if the request is not within the maximum and minimum threshold, the request may be set to the nearest of the maximum and minimum threshold to the value requested by split 544). Power/torque conversion 560 may have the same function as the combination of power-to-torque 556 and torque-to-power 548. However, power/torque 560 performs the power-to-torque conversion for a different parallel system. Similarly, limit 562 performs the same function as limit 544, but for another parallel system than limit 544.

Interaction of Power Distribution Logic with the High Voltage System

Inverter 572 receives torque request 546, and similarly inverter 574 receives a similar torque request from limit 562. Inverters 572 and 574 may include electrical inverters 222 and 242, and optionally power distribution 220 and power distribution 240, respectively. Either entity 570 may be the portion of system 100 supplied by either the first entity of the second entity. First entity 576 may be a portion of system 100 supplied by the first entity. Inverters 572 and 574 may draw power from first entity 576, via fuel cells 578 and 580 and high voltage batteries 582 and 584, respectively. Fuel cells 578 and 580 and high voltage batteries 582 and 584 send signals to FC/battery power balance. Batteries 582 and 584 may include high voltage battery modules 214 and 234, respectively. Fuel cells 578 and 580 may include fuel cell 216 and 236, respectively. The power from inverters 574 and 576 power motor-generators MGA 578 and MGB 580 (which may be motors 224 and 244), respectively, which in turn power transmission 492.

Each of signal combiners 520, 528, 530, split 540, limit 544, torque to power 548, FC/battery power balance 552, power-to-torque 556, power-torque conversion 560, and limit 562 are logic units that be implemented in software (by implementing one more machine instructions) and/or hardware.

FIG. 6 illustrate a method 600 for apportioning power between parallel systems. Method 600 may use each parallel system of the system as a degree of freedom that can be modulated in order to optimize drivability, durability, efficiency, and/or performance (e.g., while maintaining or optimizing safety). Method 600 may be implemented the logic provided by first entity 536. For example, method 600 may be implemented by split 540, limit 544, FC/battery power balance 552, and/or limit 562.

In step 602, a determination of a state of the system, which may include determining a state of charge of a plurality of battery systems that are associated with a plurality of parallel systems. Determining the state of the system may also include determining the temperature of the motors, determining a maximum power that each parallel system can produce, and/or determining a minimum power drawn that each parallel system should run at. In various embodiments, each battery system is associated with a different parallel system. In various embodiments, each parallel system is electrically isolated from the other parallel systems. In various embodiments, each battery system may be a stack of one or more batteries. In an embodiment, each parallel system is one of the parallel systems of FIGS. 2-3B (e.g., one of parallel systems 1 or 2), and/or one of parallel systems of FIG. 5 (e.g., one of parallel systems A or B). Method 600 may be an iterative process in which several iterations are computed prior to implementing a distribution of power and/or torque between power modules. The number of iterations computed may be limited to a finite number (e.g., 2, 3, 10, or 100) and/or may be limited to that which can be computed within a finite amount of time (e.g., the number of iterations may to limited to the number of iterations that can be computed within a few microseconds or a few milliseconds), that is short enough so as to ensure that the time required to compute the power distribution is less than a time that may adversely affect the drivability of the vehicle.

In step 602, a determination is made as to the temperature of the motors. If the temperature of one of the motors is too high (e.g., more than a threshold) the amount of torque that the motor can generate may need to be decreased, decreasing the amount of power the corresponding parallel system can generate. Stated differently, the motor may need to be "derated," that is down rated from a prior rating. In an embodiment, the temperature of each motor may be continually monitored, and/or an efficiently factor/rating may be freshly generated periodically indicating how efficient the motor converts electrical power into mechanical power.

In step 604, a determination is made as to a power distribution that will keep the efficiency and durability within an optimum range, which may include making a determination (e.g., by split 640 and/or FC/Battery balance 652) as to a power draw that will result in an optimized state of charge of each of the battery systems. The power distribution selected is a power distribution that tends to keep the draw of power from each battery system equal, the power distribution tending to keep the power draw on each battery system constant. Step 604 may keep the fuel efficiency within an optimum range, while taking into account motor efficiency—the efficiency of the motors in converting electrical power to mechanical power. In the short term, ignoring all other considerations, the maximum fuel efficiency is achieved by allocating as much of the power/torque demand as possible to the most efficient power modules and allocate the remaining power/torque demand to less efficient power modules. However, allocating as much power as possible to the most efficient power modules may not result in good battery management, drivability, or durability. Nonetheless, the system may first determine the allocation of torque and/or power based on the maximizing the fuel efficiency and then, prior to implementing the allocation, adjust the allocation of torque between the parallel systems and/or the power distribution, so as to account good battery management, durability, drivability, and safety (e.g., by adjusting the power or torque distribution to keep the power draw on the batteries equal and constant and further adjusting the power or torque distribution to account of the other considerations, prior to being implemented).

In other various embodiments, initially the power demand may be distributed equally between power modules and then, prior to being implemented, may be adjusted to account for other considerations. In other various embodiments, initially the power demand may be distributed between power modules proportionally to the capacity of each power module and then, prior to being implemented, may be adjusted to account for other considerations. In various embodiment, for a power distribution and/or torque allocation that keeps the bower draw on the battery systems equal and constant and then, prior to implementing the power distribution initially computed, the power distribution is adjusted based on other factors. In other various embodiments, initially the power distribution may be to be the same as the most recently implements power distribution, and then, prior to being implemented, may be adjusted to account for the current changes in the state of the system and/or the current power demand.

In step 606, a determination is made whether the drivability is within an optimum range (e.g., by split 640 and/or FC/Battery balance 652, optionally assisted by torque to power 648 and/or power to torque 656, to ensure that a requested torque is met). If drivability is within not an optimum range, the method returns to step 604 to determine a new power distribution.

Step 606 may include, substep of 608 which may include, determining whether the power distribution will result in one of the parallel systems operating at a frequency that is close to resonance (that is, within a predetermined frequency band encompassing the resonant frequency) and/or may otherwise result in vibrations. If the power distribution will result in the shaft rotating within a frequency band encompassing a resonant frequency and/or would therefore cause vibrations, the method returns to step 604 to determine a new power distribution, in which the shaft does not rotate at a frequency within a frequency band that encompasses a resonant frequency. For example, the torque request sent to the motors may be increased or decreased to avoid the frequency band encompassing the resonant frequency.

Step 606 may also include substep 610, which may include determining whether the power distribution will result causing a sudden change in frequency of rotation of one of the motors, frequently changing gears, a sudden acceleration or deceleration of system 100, and/or other shock to system 100. If the power distribution will result in a shock, method 600 returns to step 604 to determine a new power distribution.

In step 612, a determination is made whether the durability is within an optimum range. If the power distribution results in an unacceptable durability, the method returns to step 604, where power distribution is adjusted, so as to keep the durability within an optimum range. Step 612 may include checking whether the state of the charge of the batteries of each parallel system is managed properly and checking whether a fuel cells will need to be turned on and off more frequently than a predetermined threshold.

In step 614, a determination is made (e.g., by limit 644 and/or 662) for each parallel system whether the power draw is higher than a maximum available power for each parallel system. Step 614 may be based on the conversion rates of converting electrical power to mechanical power (by producing a given amount of torque) for each power sub system. If the power draw of a parallel system is higher the maximum, the method returns to step 604 to determine a new power distribution. Step 614 may include determining how much power is being used by each given parallel system for accessories and subtracting the power being drawn by accessories from the total available power of that parallel system.

In step 616, a determination is made (e.g., by limit 644 and/or 662) as to whether the power draw of each parallel system is below a minimum value. For example, the minimum power draw may be an amount of power that is just high enough and/or safely high enough to avoid cycling the fuel cells of the fuel cell systems on and off faster than a threshold frequency. If the frequency of cycling for one of the parallel systems is lower than a threshold frequency, the method returns to step 604, where the power distribution is adjusted so that the frequency of the cycling (frequency of turning the fuel cell on and off) for the parallel system is lower than the threshold frequency. Step 616 may be part of step 612.

In step 618, a determination is made (by split 640 and/or FC/Battery balance 652, optionally assisted by torque to power 648 and/or power to torque 656) whether the safety is within an optimum range. If the safety is not within an optimum range or if a specific safety issue is created by the power distribution, adjusting the power distribution to keep the safety with the desirable range. Step 618 may include checking whether the current power distribution has a chance of causing failure of a part of system 100 due to being overly stressed for example and/or whether other safety issues may be triggered.

Each parallel system may have a different amount of power that the parallel system can generate and/or that is available for torque generation/driving system 100, either because some the power of a given parallel system is being used for accessories and/or because different parallel systems may have a different states of charge than other parallel systems, the motors of the parallel systems may be running at different temperatures, and/or avoiding running the motors within particular frequency bands may require using different torque request for each parallel system than would otherwise be requested, for example. The final optimum power distribution may result in requesting different amounts of torque from different parallel systems (in other words, the optimization process may result in requesting an unbalanced torque distribution and/or power distribution), so to improve the performance, efficiency, drivability, durability and/or safety system 100, overall.

The steps of method 600 may be continually repeated as system 100 is operated, so as to continually adjust the power distribution as the state of the system 100 changes. Steps 602-618 may be performed in any order and/or any of the steps 602-618 may be performed concurrently, so long as the safety is prioritized over drivability, drivability is prioritized over durability, and durability is prioritized over fuel efficiency.

Figure 7:
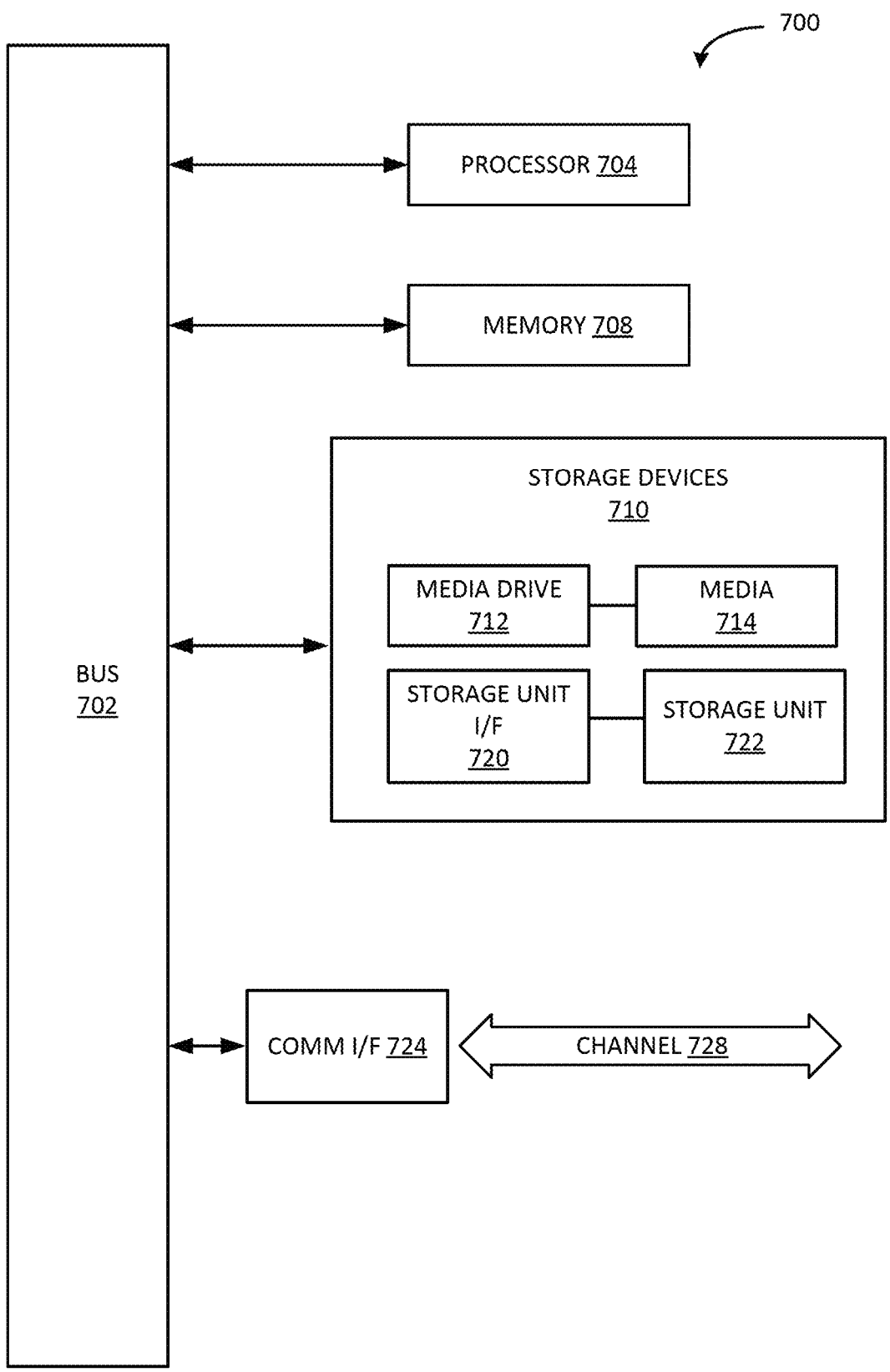
FIG. 7 illustrates a computing component that may be used with the systems of FIGS. 1-6.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display and/or the ECUs of vehicle system 100. Computing component 700 might also represent computing capabilities embedded within or otherwise available to a given component of system 100. Any of the ECUs of system 100 and/or control modules 128 may be a computing component 700.

Computing component 700 might include, for example, one or more processors, controllers, control components, or other processing devices. This can include a processor, and/or any one or more of the components making up system 100. Processor 704 might be implemented using a general-purpose or special-purpose processing engine such as, for example, a microprocessor, controller, or other control logic. Processor 704 may be included within or may include processor 124. Processor 704 may be connected to a bus 702. However, any communication medium can be used to facilitate interaction with other components of computing component 700 or to communicate externally.

Computing component 700 might also include one or more memory components, simply referred to herein as main memory 708. Main memory 708 may include, or may be included within, memory system 126. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, storage medium 714 may include a hard disk drive, a solid-state drive, a magnetic tape drive, or an optical drive. Storage media 714 might include, for example, a hard disk, an integrated circuit assembly. Storage media 714 may be any other fixed or removable medium that is read by, written to, or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices and/or between different components of system 100. Examples of communications interface 724 might include a modem or soft modem, a network interface (such as Ethernet, network interface card, IEEE 802.XX or another interface). Other examples include a communications port (such as for example, a USB port, IR port, RS232 port Bluetooth® interface, or other port), or another communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

In an alternative embodiment, any of the ECUs of system 100 may be logic circuits specially design to perform the functions that describe in this specification.

It should be understood that the various features, aspects, and functionalities described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A modular system of a vehicle comprising:
a shaft; and
a plurality of parallel systems that are electrically isolated from one another, the plurality of parallel systems comprising:
a first parallel system for rotating the shaft, the first parallel system comprising a first motor coupled to the shaft to rotate the shaft, a first parallel system power generation module coupled to the first motor to drive the first motor, a fuel cell electrically connected to supply electrical power to the first motor, and a battery electrically connected to supply power to the first motor; and
a second parallel system to rotate the shaft, the second parallel system comprising a second motor coupled to the shaft for rotating the shaft, and a second parallel system power generation module coupled to the second motor to drive the second motor.

2. The modular system of claim 1, further comprising:
an electrical control system that
receives input indicative of an amount of torque to request the modular system to produce; and
apportions generation of an amount of power between the plurality of parallel systems,
wherein the apportioning is performed based on individual states of individual parallel systems of the plurality of parallel systems; and
wherein the electrical control system comprises states in which the first parallel system provides a different amount of torque than the second parallel system.

3. The modular system of claim 1, further comprising:
an electrical control unit comprising states in which a different percentage of a total power is requested from different parallel systems of the plurality of parallel systems, wherein the total power is a total power requested for driving the vehicle.

4. A modular system of a vehicle comprising:
a shaft;
an electrical control system; and
a plurality of parallel systems, the plurality of parallel systems comprising:
  a first parallel system to rotate the shaft, the first parallel system comprising a first motor coupled to the shaft for rotating the shaft, a first parallel system power generation module coupled to the first motor to drive the first motor, a fuel cell electrically connected to supply electrical power to the first motor, and a battery electrically connected to supply power to the first motor; and
  a second parallel system to rotate the shaft, the second parallel system comprising a second motor coupled to the shaft for rotating the shaft, and a second parallel system power generation module coupled to the second motor to drive the second motor;
wherein, when the electrical control system is activated, the electrical control system performs operations comprising:
  receiving input indicative of an amount of torque to request the modular system to produce; and
  apportioning generation of the amount of power between the plurality of parallel systems;
wherein the apportioning depends at least on individual states of individual parallel systems of the plurality of parallel systems; and
wherein the electrical control system comprises states that occur during normal operation in which the first parallel system is requested to provide a different mount of torque than the second parallel system.

5. The modular system of claim 4, wherein the first parallel system further comprises:
  a first-parallel system energy module of a first type, that supplies electrical power to the first motor; and
  a first-parallel system energy module of a second type, that supplies electrical power to the first motor.

6. The modular system of claim 4, the apportioning being determined to apportion power between the plurality of parallel systems in order to keep a current state of charge of batteries of the plurality of parallel systems above a threshold value.

7. The modular system of claim 4, the apportioning being determined to apportion power between the plurality of parallel systems in order to keep a given power requested from a given parallel system of the plurality of parallel systems below an upper threshold that is based on a maximum available power of that is available, via the given parallel system, for driving the modular system.

8. The modular system of claim 4, the apportioning being determined to apportion power between the plurality of parallel systems in order to keep a given power requested from a given parallel system of the plurality of parallel systems above a lower threshold.

9. The modular system of claim 4, the apportioning being determined to apportion power between the plurality of parallel systems in order to equalize a power draw from each battery system of each parallel system with respect to one another, so as to extend battery life.

10. The modular system of claim 4, the apportioning being determined to apportion power between the plurality of parallel systems in order to maintain a constant draw of power from each battery system of each parallel system, when the battery system is not being charged, so as to extend battery life.

11. The modular system of claim 4, the apportioning being determined to apportion power between the plurality of parallel systems in order to equalize a draw of charge from each battery of each parallel system with respect to one another.

12. The modular system of claim 4, the apportioning being determined to apportion power between the plurality of parallel systems in order to achieve a fuel efficiency that is higher than without the apportioning.

13. The modular system of claim 4, the apportioning being determined to apportion power between the plurality of parallel systems in order to maintain a durability of the modular system that is better than without the apportioning.

14. The modular system of claim 4, the apportioning being determined to apportion power between the plurality of parallel systems in order to keep the amount of cycling between turning on a given parallel system of the plurality of parallel systems and turning off the given parallel system to less than a threshold value.

15. The modular system of claim 4, the apportioning being determined to apportion power between the plurality of parallel systems in order to maintain specified drivability requirements.

16. The modular system of claim 15, wherein the drivability requirements include keeping vibrations less than a predefined threshold.

17. The modular system of claim 4, wherein the apportioning comprises diverting power from a parallel system having a torque derating to a system that does not have a torque derating, so as to meet a requested torque.

18. The modular system of claim 4, wherein the apportioning comprises diverting power from a parallel system having a motor that is running at a higher temperature than other motors of the modular system.

19. The modular system of claim 4, the apportioning being determined to apportion power between the plurality of parallel systems in order to rotate the shaft outside of a specified frequency band that includes a resonant frequency of the modular system.

20. The modular system of claim 2, wherein the apportioning comprises diverting power from a parallel system having a torque derating to a system that does not have a torque derating, so as to meet a requested torque.

* * * * *